United States Patent [19]
Trompower

[11] Patent Number: 6,132,306
[45] Date of Patent: Oct. 17, 2000

[54] CELLULAR COMMUNICATION SYSTEM WITH DEDICATED REPEATER CHANNELS

[75] Inventor: Michael L. Trompower, Navarre, Ohio

[73] Assignee: Cisco Systems, Inc., San Jose, Calif.

[21] Appl. No.: 08/625,421

[22] Filed: Mar. 29, 1996

Related U.S. Application Data

[63] Continuation-in-part of application No. 08/566,502, Dec. 4, 1995, Pat. No. 5,950,124, which is a continuation-in-part of application No. 08/523,942, Sep. 6, 1995, abandoned.

[51] Int. Cl.[7] .................................................. H04J 3/22
[52] U.S. Cl. ................................. 453/11.1; 455/450
[58] Field of Search .................................. 455/11.1, 450, 455/422, 63, 524, 517, 572, 561, 426, 446, 447, 448, 466; 370/335, 342, 468; 375/140, 146, 147, 141, 220

[56] References Cited

U.S. PATENT DOCUMENTS

| | | |
|---|---|---|
| 4,041,389 | 8/1977 | Oades ........................................ 455/17 |
| 4,041,391 | 8/1977 | Deerkoski . |
| 4,456,793 | 6/1984 | Baker et al. . |
| 4,509,199 | 4/1985 | Ichihara ..................................... 455/7 |
| 4,534,061 | 8/1985 | Ulug ......................................... 455/17 |
| 4,539,706 | 9/1985 | Mears et al. ........................... 455/11.1 |
| 4,665,404 | 5/1987 | Christy et al. . |
| 4,672,658 | 6/1987 | Kavehrad et al. ......................... 379/63 |
| 4,799,252 | 1/1989 | Eizenhoffer et al. .................... 370/330 |
| 4,856,046 | 8/1989 | Streck et al. . |
| 4,882,765 | 11/1989 | Maxwell et al. ....................... 455/11.1 |
| 4,907,224 | 3/1990 | Scoles et al. . |
| 4,930,140 | 5/1990 | Cripps et al. . |
| 5,025,486 | 6/1991 | Klughart . |
| 5,042,050 | 8/1991 | Owen ........................................ 375/1 |
| 5,133,080 | 7/1992 | Borras ..................................... 455/15 |
| 5,152,002 | 9/1992 | Leslie et al. ........................... 455/11.1 |
| 5,164,958 | 11/1992 | Omura . |
| 5,177,766 | 1/1993 | Holland et al. . |
| 5,204,876 | 4/1993 | Bruckert et al. ........................... 375/1 |
| 5,223,923 | 6/1993 | Morales-Garza . |
| 5,241,410 | 8/1993 | Streck et al. . |
| 5,258,867 | 11/1993 | Iggulden et al. . |
| 5,267,244 | 11/1993 | Messerchmitt et al. ............... 370/95.3 |
| 5,291,516 | 3/1994 | Dixon et al. . |
| 5,321,721 | 6/1994 | Yamaura et al. ........................... 375/1 |
| 5,327,580 | 7/1994 | Vignali et al. . |
| 5,335,249 | 8/1994 | Krueger et al. ............................ 375/1 |
| 5,341,396 | 8/1994 | Higgins et al. . |
| 5,353,300 | 10/1994 | Lee et al. . |
| 5,363,404 | 11/1994 | Kotzin et al. .............................. 375/1 |
| 5,377,256 | 12/1994 | Franklin et al. . |
| 5,425,051 | 6/1995 | Mahany . |
| 5,442,625 | 8/1995 | Giltin et al. ............................. 370/18 |
| 5,450,616 | 9/1995 | Rom . |
| 5,490,284 | 2/1996 | Itoh et al. ............................. 455/11.1 |
| 5,493,436 | 2/1996 | Karasawa et al. . |
| 5,509,050 | 4/1996 | Berland . |
| 5,511,073 | 4/1996 | Padovani et al. . |
| 5,565,982 | 10/1996 | Lee et al. . |
| 5,574,771 | 11/1996 | Driessen et al. ......................... 379/57 |

(List continued on next page.)

FOREIGN PATENT DOCUMENTS

| | | |
|---|---|---|
| 579372 | 1/1994 | European Pat. Off. . |
| 622911 | 11/1994 | European Pat. Off. . |
| WO 94/11957 | 5/1994 | WIPO . |

*Primary Examiner*—Nay Maung
*Assistant Examiner*—Tracy M. Legree
*Attorney, Agent, or Firm*—Arter & Hadden LLP

[57] ABSTRACT

A cellular communication system in which dedicated repeater controller transceivers are included in base stations and wireless base stations. The repeater controller transceivers are configured to operate on a different channel as compared to communications received by or transmitted directly from mobile terminals. By utilizing a dedicated channel for communications between the base stations and wireless base stations, the contention areas formed by overlapping cell areas is effectively eliminated. The different channels may be based on differences in parameters such as frequency and/or data encoding techniques.

26 Claims, 19 Drawing Sheets

U.S. PATENT DOCUMENTS

| | | | |
|---|---|---|---|
| 5,613,225 | 3/1997 | Charas | 455/103 |
| 5,614,914 | 3/1997 | Bolgiano et al. | |
| 5,673,260 | 9/1997 | Umeda et al. | |
| 5,687,166 | 11/1997 | Natali et al. | |
| 5,689,524 | 11/1997 | Takaki et al. | |
| 5,694,417 | 12/1997 | Andren et al. | |
| 5,715,236 | 2/1998 | Gilhousen et al. | 370/209 |
| 5,724,665 | 3/1998 | Abassi et al. | |
| 5,802,173 | 9/1998 | Hamilton-Piercy et al. | |

CELLULAR COMMUNICATION SYSTEM WITH DEDICATED REPEATER CHANNELS

CROSS-REFERENCE TO RELATED APPLICATIONS

This application is a Continuation-In-Part of Ser. No. 08/566,502, filed Dec. 4, 1995 now U.S. Pat. No. 5,950,124, which is a Continuation-In-Part of Ser. No. 08/523,942, filed Sep. 6, 1995 now abandoned, the entireties of which are incorporated herein by reference.

TECHNICAL FIELD

The present invention relates a cellular communication system utilizing dedicated repeater channels and modifiable transmission parameters to enhance system performance.

BACKGROUND

In recent years, the use of cellular communication systems having mobile terminals which communicate with a hardwired network, such as a local area network (LAN) and a wide area network (WAN), has become widespread. Retail stores and warehouses, for example, may use cellular communications systems to track inventory and replenish stock. The transportation industry may use such systems at large outdoor storage facilities to keep an accurate account of incoming and outgoing shipments. In manufacturing facilities, such systems are useful for tracking parts, completed products and defects.

A typical cellular communication system includes a number of fixed base stations interconnected by a cable medium to form a hardwired network. The hardwired network is often referred to as a system backbone. Also included in many cellular communication systems are intermediate base stations which are not directly connected to the hardwired network. Intermediate base stations, often referred to as wireless base stations, increase the area within which base stations connected to the hardwired network can communicate with mobile terminals. Unless otherwise indicated, the term "base station" will hereinafter refer to both base stations hardwired to the network and wireless base stations.

Associated with each base station is a geographic cell. A cell is a geographic area in which a base station has sufficient signal strength to transmit data to and receive data from a mobile terminal with an acceptable error rate. The error rate for transmitted data is defined as the ratio of the number of transmitted data bits received in error to the total number of bits transmitted. It is economically inefficient to design a communications system with a "zero" error rate. Rather, depending on the requirements of users of the system, an acceptable error rate is determined. For example, an acceptable error rate may be set at a maximum error correcting rate capability of an error correcting code utilized by the system.

The shape of each cell is primarily determined by the type of antenna associated with a given base station. For instance, base stations which communicate with mobile terminals often have omnidirectional type antennas which provide for generally circular shaped cells and allow for a wide area of coverage. In many instances, however, the cell of a base station is not completely symmetrical because physical structures within the cell may partially block data signals emanating from the base station or create "dead spots" where no signals can pass. Further, the cell size may be decreased by machinery located in the vicinity of the base station which generates excessive noise levels that degrade a signal transmitted by the base station. Undesirable signals that interfere with the transmission and reception of a transmitted signal are collectively referred to as noise signals. A useful quantitative measure of relative noise in a communication system is the signal-to-noise ratio (SNR). The SNR is the ratio of the amplitude of a desired signal at any given time to the amplitude of noise signals at that same time.

Generally, when a mobile terminal is powered up, it "registers" with a base station through which the mobile terminal can maintain wireless communication with the network. In order to register, the mobile terminal must be within the cell range of the base station and the base station must likewise be situated within the effective cell range of the mobile terminal. It is generally not possible to have one base station service a large area by itself. This is due to transmission power restrictions governed by the FCC and the fact that the extra hardware needed to provide a mobile terminal with such a large cell range would add significantly to the size and weight of the mobile terminal thereby making it less desirable to use. Thus, cellular communication systems generally have several base stations spaced apart such that the collective cell area coverage of the base stations is sufficient to cover the entire area in which a mobile terminal may roam. As the location of the mobile terminal changes, the base station with which the mobile terminal was originally registered may fall outside of the geographic cell range of the mobile terminal. Therefore, the mobile terminal may "de-register" with the base station it was originally registered to and register with another base station which is within its communication range.

When designing a cellular communication system for a region, an appropriate number of base stations must be selected and their locations determined to assure cell coverage for the region. Each additional base station increases the cost of the communication system by the incremental cost of the base station itself and installation fees. When hardwiring a new base station to the network, both a data line and a power line must be provided. The data line allows the base station to transmit and receive information from the system backbone while the power line provides continual power to support the operations of the base station. Although wireless base stations do not require data lines since all data is communicated wirelessly, they do require power. However, providing power lines to wireless base stations can often be difficult. This is especially true in the common situation where a wireless base station is situated in a large outdoor storage facility having a concrete foundation, such as areas near a shipyard or loading dock. Typically, electrical outlets are not readily accessible in such areas and therefore power lines must be supplied to the wireless base station from the network or elsewhere. Power lines could be located on the surface of the concrete foundation, however, this provides an undesirable obstacle that must be avoided by heavy loading vehicles typically found operating at such facilities. Consequently, a trench is often created through the concrete in order to house the power lines. Unfortunately, providing such a trench adds a significant amount of extra time and cost to the installation process. Another method of supplying power to wireless base stations could involve suspending power lines from power poles. However, this method has been found implausible given the difficulty involved with erecting such power poles in the concrete foundation. As a result, there is a strong need in the art for a manner of supplying power to a wireless base station that is not unduly burdensome or costly.

Wireless communication systems such as those described above often involve spread spectrum (SS) technology. An SS communication system is one in which the transmitted frequency spectrum or bandwidth is much wider than absolutely necessary. Generally, SS technology is utilized for communications in the unlicensed bands provided by the FCC. These bands include the 902–928 MHZ and 2.4–2.48 GHz ranges in the U.S. The FCC requires that information transmitted in these bands be spread and coded in order to allow multiple user access to these bands at the same time.

One type of a digital SS communication system is known as a direct sequence spread spectrum (DSSS) system. The coding scheme of a SS digital communication system utilizes a pseudo-random binary sequence (PRBS). In a DSSS system, coding is achieved by converting each original data bit (zero or one) with a predetermined repetitive pseudo noise (PN) code. The PN code is used to convert effectively each data bit into a series of sub-bits often referred to as "chips". The rate of transmission of chips by a transmitter is defined as the "chipping rate". A type of PN code is illustrated in FIG. 1. For this example, the digital data signal 110 is made up of a binary "1" bit and a "0" bit. A PN code 120 representing the digital data signal 110 is comprised of a sequence of ten sub bits or chips, namely, "1"; "0"; "1", "1", "0", "1", "1", "1", "0", "1".

The digital data signal 110 is coded or spread by modulo 2 multiplying (e.g., via an "EXCLUSIVE NOR" (XNOR) function) of the digital data signal 110 with the PN code 120. If the data bit is a "1", then the resulting spread data signal (PN coded signal) in digital form corresponds to the PN code 120. However, if the data bit to be coded is a "0", then the spread data signal in digital form will correspond to a code 130. As can be seen, the code 130 is the inverse of PN code 120. That is, the PN code and its inverse are used to represent data bits "1" and "0" respectively.

A PN code length refers to a length of the coded sequence (the number of chips) for each original data bit. As noted above, the PN code length effects the processing gain. A longer PN code yields a higher processing gain which results in an increased communication range. The PN code chipping rate refers to the rate at which the chips are transmitted by a transmitter system. A receiver system must receive, demodulate and despread the PN coded chip sequence at the chipping rate utilized by the transmitter system. At a higher chipping rate, the receiver system is allotted a smaller amount of time to receive, demodulate and despread the chip sequence. As the chipping rate increases so to will the error rate. Thus, a higher chipping rate effectively reduces communication range. Conversely, decreasing the chipping rate increases communication range.

The spreading of a digital data signal by the PN code does not effect overall signal strength (or power) the data being transmitted or received. However, by spreading a signal, the amplitude at any one point typically will be less then the original (non-spread) signal.

It will be appreciated that increasing the PN code length or decreasing the chipping rate to achieve a longer communication range will result in a slower data transmission rate. Correspondingly, decreasing the PN code length or increasing the chipping rate will increase data transmission rate at a price of reducing communication range.

Additional methods of coding information in a SS system also exist. For example, in a frequency hopping (FH) system, data bits are spread and transmitted using a psuedo-random hop sequence. The hop sequence involves switching between different frequency channels in a given bandwidth. Only transmitters and receivers hopping on the same sequence are capable of communication with one another. Thus, multiple users can share the same bandwidths without significant interference by selecting different pseudo-random hop sequences with which to communicate. This is similar to DS systems where multiple users select different PN codes to avoid interference.

FIG. 1A schematically illustrates a transmitter system or assembly 100 of a DSSS system. Original data bits 101 are input to the transmitter system 100. The transmitter system includes a modulator 102, a spreading function 104 and a transmit filter 106. The modulator 102 modulates the data onto a carrier using, for example, a binary phase shift keying (BPSK) modulation technique. The BPSK modulation technique involves transmitting the carrier in-phase with the oscillations of an oscillator or 180 degrees out-of-phase with the oscillator depending on whether the transmitted bit is a "0" or a "1". The spreading function 104 converts the modulated original data bits 101 into a PN coded chip sequence, also referred to as spread data. The PN coded chip sequence is transmitted via an antenna so as to represent a transmitted PN coded sequence as shown at 108.

FIG. 1A also illustrates a receiver system or assembly, shown generally at 150. The receiver system 150 includes a receive filter 152, a despreading function 154, a bandpass filter 156 and a demodulator 158. The PN coded data 108 is received via an antenna and is filtered by the filter 152. Thereafter, the PN coded data is decoded by a PN code despreading function 154. The decoded data is then filtered and demodulated by the filter 156 and the demodulator 158 respectively to reconstitute the original data bits 101. To receive the transmitted spread data, the receiver system 150 must be tuned to the same predetermined carrier frequency and be set to demodulate a BPSK signal using the same predetermined PN code.

More specifically, to receive a SS transmission signal, the receiver system must be tuned to the same frequency as the transmitter assembly to receive the data. Furthermore, the receiver assembly must use a demodulation technique which corresponds to the particular modulation technique used by the transmitter assembly (i.e. same PN code length, same chipping rate, BPSK). Because mobile terminals communicate with a common base station, each device in the cellular network must use the same carrier frequency and modulation technique.

An important aspect of any cellular communication system is the ability to optimize overall system performance. System performance may be optimized, for example, by communicating information at the fastest possible rates while minimizing packet errors, collisions and/or the need to re-transmit information among devices.

A drawback associated with current cellular communication systems is that PN code parameters such as PN code length and chipping rate must be selected to provide performance based on average communication range and average noise conditions. The data rate/range tradeoff leads to a cell size/throughput tradeoff in the communication system. The rate that each transmission occurs will limit the size of each cell. Thus, it would be desirable to have a cellular communication system wherein PN code parameter, modulation complexity and other transmitting and receiving parameters could be dynamically modified for each transmission based on distance between the transmitter and receiver and noise conditions such that an improved data transmission rate for that transmission could be achieved thereby enhancing system performance.

A further drawback associated with cellular communication systems is related to those systems utilizing wireless base stations. More particularly, the cell area of a wireless base station typically overlaps to a large extent the cell area associated with a base station hardwired to the network. Mobile terminals which roam into the overlapping areas transmit signals which are received or "heard" by both the base station and the wireless base station. This can occur despite the fact that the mobile terminal will typically be registered to only one of the devices, namely the mobile terminal is registered to communicate with either the base station or the wireless base station. Since many systems operate under a Collision Sense Multiple Access (CSMA) protocol, each base station (wireless and hardwired) and mobile terminal "listens" to the signal traffic in the air before transmitting information in order to avoid packet collisions. If the air is busy with signal traffic, the device performs a random back off in order to allow time for the air to clear. Unfortunately, in areas where there is overlapping cell coverage each transmission from a mobile terminal will cause the air signal traffic to be busy for both the wireless base station and the base station hardwired to the network. Thus, extra delays will occur due to the random backoff.

Similarly, the mobile terminals will also experience additional delays due to their internal random backoff protocol when attempting to transmit information in areas of contention. Further, even in systems not implementing CSMA or other similar protocol, there will be many times where two devices transmit information simultaneously. When this happens, both packets collide and each device must retransmit its packet, thereby also causing a loss in overall system performance.

Accordingly, it is also highly desirable to have a cellular communication system and method in which system performance can be optimized by eliminating unnecessary delays and packet collisions caused by overlapping cell areas of base stations and wireless base stations.

SUMMARY OF THE INVENTION

The present invention includes an apparatus and a process for enhancing the performance capabilities of a cellular communication system. The cellular communication system of the present invention includes a plurality of mobile terminals and a plurality of base stations. The base stations may be connected to a hardwired network backbone or serve as wireless base stations. Each base station can transmit and receive data in its respective cell. For a given communication between a mobile terminal and a base station, the mobile terminal and the base station according to one feature of the invention can adjust the PN code length and the chipping rate depending on communication conditions to increase the transmission rate while retaining an acceptable error rate. Moreover, the system also provides that system components can adjust between other cellular communication system transmission parameters such as between different modulation schemes and/or different transmitter power levels in conjunction with PN code adjustments to further enhance the performance capabilities of the system.

According to another feature of the invention, dedicated repeater controller transceivers are coupled to the base stations and wireless base stations. The repeater controller transceivers are configured to typically operate on a different communication channel as compared to communications received by or transmitted directly from the mobile terminals. For example, a wireless base station may include two transceivers, one to be used for communicating directly with base stations hardwired to the backbone or other wireless base stations while the other transceiver handles all direct communications with mobile terminals. This reduces or avoids the number of random backoffs and/or packet collisions which may occur in overlapping cell areas. By utilizing a dedicated channel for communications between the base stations and wireless base stations, the contention areas formed by overlapping cell areas is effectively eliminated. The different channels may be based on different parameters such as frequency and/or PN code parameters including PN code sequences and PN code lengths.

According to one particular aspect of the invention, a cellular communication system is provided including a base station coupled to a system backbone; a mobile terminal for communicating with the system backbone by way of the base station; and a wireless base station serving as an intermediary for communications between the mobile terminal and the base station; wherein the base station includes a base station transceiver for wirelessly communicating with the mobile terminal directly on a first communication channel, and a repeater controller transceiver for wirelessly communicating with the wireless base station on a second communication channel, the first communication channel being different from the second communication channel.

In accordance with another aspect, in a cellular communication system comprising a base station coupled to a system backbone, a mobile terminal for communicating with the system backbone by way of the base station, and a wireless base station serving as an intermediary for communications between the mobile terminal and the base station, a method of communication is provided including the steps of the base station wirelessly communicating with the mobile terminal directly on a first communication channel, and wirelessly communicating with the wireless base station on a second communication channel, the first communication channel being different from the second communication channel.

According to yet another aspect, a base station is provided for use in a cellular communication system having a system backbone, at least one mobile terminal and at least one wireless base station. The base station includes a communication circuit coupling the base station to the system backbone; a base station transceiver for wirelessly communicating with the at least one mobile terminal directly on a first communication channel, and a repeater controller transceiver for wirelessly communicating with the at least one wireless base station on a second communication channel, the first communication channel being different from the second communication channel.

According to yet another aspect, a wireless base station is provided for use in a cellular communication system having a system backbone, at least one mobile terminal and at least one base station coupled to the backbone. The wireless base station includes a wireless base station transceiver for wirelessly communicating with the mobile terminal on a first communication channel; and a wireless base station repeater controller transceiver for wirelessly communicating with the base station on a second communication channel, the first communication channel being different from the second communication channel.

In accordance with still another aspect, a cellular communication system is provided including a plurality of base stations coupled to a system backbone; a plurality of mobile terminals for communicating with the system backbone by way of at least one of the base stations; and a plurality of wireless base stations serving as intermediaries for communications between the mobile terminals and the base stations; wherein wireless communications directly between the mobile terminals and at least one of the base stations and wireless base stations are on a first communication channel, and wireless communications directly between the base stations and the wireless base stations are on a second communication channel different from the first communication channel.

The aforementioned features and other aspects of the present invention are described in more detail in the detailed description and accompanying drawings which follow.

DETAILED DESCRIPTION OF THE INVENTION

Figure 2:
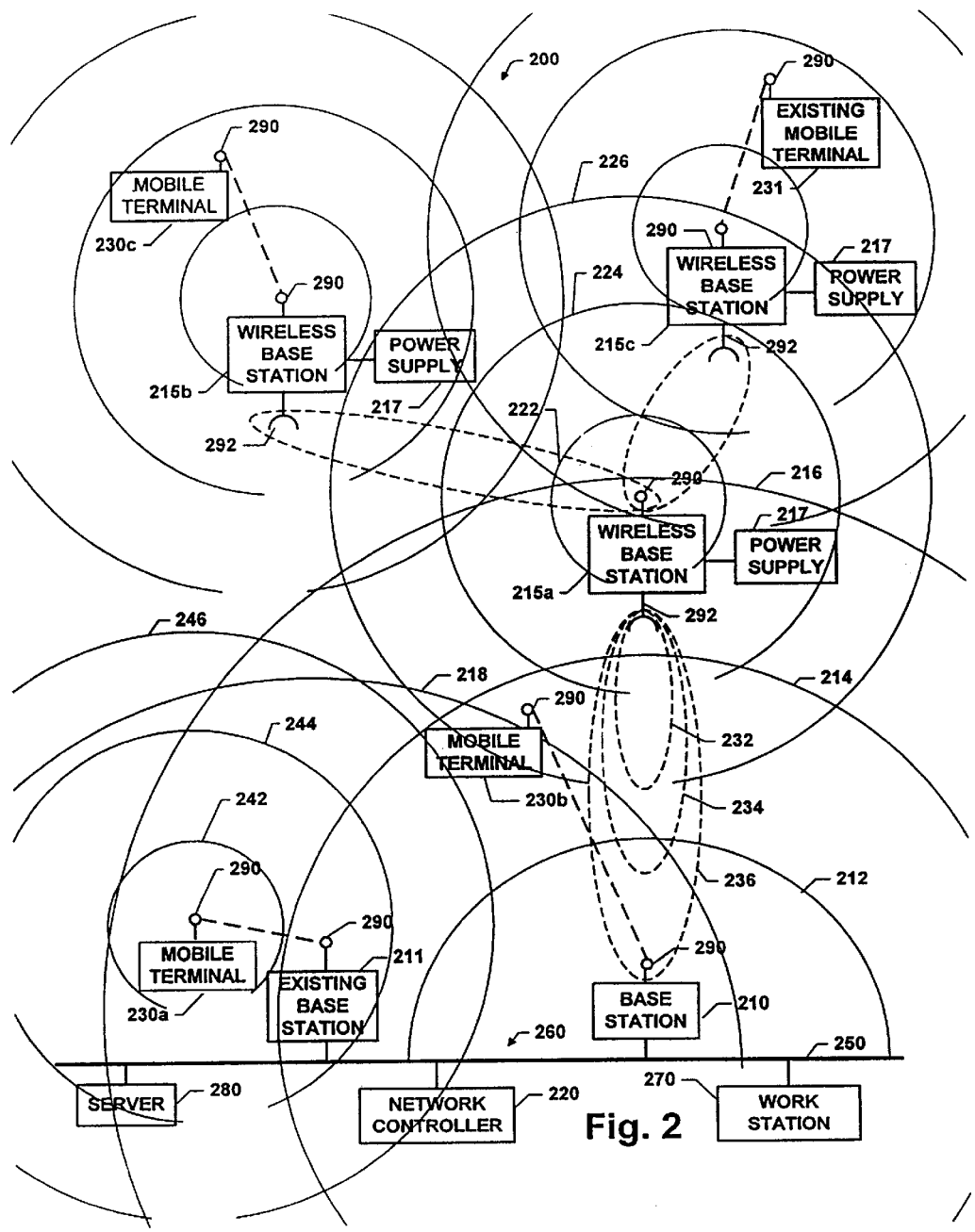
FIG. 2 is a schematic representation of a cellular communication system of the present invention.

FIG. 2 schematically illustrates a cellular communication system, shown generally at 200, in accordance with the present invention. The cellular communication system 200 may be one of several types including a local area network (LAN) or a wide area network (WAN).

The cellular communication system 200 of this exemplary embodiment has a network 250 which forms a hardwired data communication path. The hardwired data communication path may be made of a twisted pair cable, shielded coaxial cable or fiber optic lines, for instance, and is often referred to as the system backbone 260. Connected to the system backbone 260 is a base station 210 which is capable of dynamically modifying one or more of its data transmission parameters in accordance with this invention. Also connected to the system backbone 260 is a conventional base station 211 having generally fixed data transmission parameters. Each base station 210, 211 wirelessly communicates with other devices in the system 200 via an omnidirectional antenna 290 which allows for a generally spherical area of coverage. Directional yagi type antennas or other forms of antennas could also readily be used as will be appreciated. The antenna 290 allows each base station 210, 211 to transmit and receive data within a respective geographic cell. As is discussed below, the cell size is the geographic area in which a device can communicate with another device in a cellular communication system 200. The present invention permits the base station 210 to adjust effectively its cell size in order to better optimize overall system performance. The adjustability of the cell size of base station 210 is schematically illustrated by curved lines labeled 212, 214, 216 (corresponding to a fast, mid, and slow data transmission rate, respectively). Conventional base station 211 has a fixed cell 218 associated with it, wherein cell 218 is of the mid cell size in this particular embodiment. The cellular communication system 200 generally will have several dynamic base stations 210 and/or several conventional base stations 211 spaced apart along the system backbone 260. However, for purposes of illustration and simplicity, only one of each is shown in this embodiment.

Other components of the system 200 that may be wired to the backbone 260 include a client/server network composed of a work station (client) 270, such as an IBM compatible personal computer, and a server 280, such as an IBM RS/6000. A network controller 220 may also be wired to the backbone 260 to control the flow of data between the base station 210 and other components wired to the backbone 260. The network controller 220 may communicate with the components wired to the backbone 260 using a variety of protocols, such as the Ethernet protocol or the Token Ring protocol.

In order to expand the effective communication range of base stations 210, 211 connected to the network, several wireless base stations designated 215a, 215b, and 215c are included in the cellular communication system 200. When referenced collectively, wireless base stations 215a, 215b, and 215c will hereinafter be referred to as wireless base station 215. Each wireless base station 215 is shown to have a power supply 217. The power supply 217 may be hard-wired to an existing power source via power lines or, it may be an auxiliary power source in accordance with the invention. Such an auxiliary power source may use solar power, as is described below, or it may use other natural energy sources such as wind or water.

In this particular embodiment, each wireless base station 215 is shown to have connected to it both an omnidirectional antenna 290 and a yagi type directed antenna 292. The omnidirectional antennas 290 allow for a spherical area of coverage, whereas the yagi type antennas 292 allow for a more elongated, elliptical shaped cell coverage. The yagi type antennas 292 are commonly used when communication is maintained with another device having a fixed location in order to allow for longer distance coverage. Similar to the base station 210 mentioned above, each wireless base station 215 of this invention can vary its cell size to allow for optimal settings. For example, wireless base station 215a is shown to have an omnidirectional antenna 290 which provides for cell area coverage illustrated by circular lines 222, 224, 226 and a yagi type antenna 292 which allows for directed cell area coverage illustrated by elliptical lines 232, 234, 236. In other embodiments, it is likely that a wireless base station may be configured to operate with one antenna. Although not completely shown or labeled for the sake of simplicity, wireless base stations 215b and 215c have similar cell area coverage.

The cellular communication system 200 also includes one or more mobile terminals each referred to generally as a mobile terminal 230. The mobile terminals 230 are each capable of dynamically modifying their data transmission parameters in accordance with the invention as is described more fully below. In this particular embodiment, three mobile terminals designated 230a, 230b, 230c are communicating with devices connected to the network 250. Also shown within the cellular communication system is a conventional mobile terminal 231 with generally fixed parameters. The mobile terminals 230, 231 are capable of roaming from cell to cell and using a registration and deregistration process to assure a single entry point to the backbone 260, as is described in more detail below. The mobile terminals 230, 231 may include a hand held or arm mounted portable computer, or a portable data form reader mounted to a vehicle, for example.

Connected to each mobile terminal 230, 231 is an omnidirectional antenna 290. Omnidirectional antennas allow for a generally spherical cell area coverage which is often beneficial for roaming mobile terminals, however other types of antennas could readily be used. In accordance with the exemplary embodiment of this invention described herein, each mobile terminal 230 has an adjustable cell size as is representatively indicated by cells 242, 244, and 246 (corresponding to fast, mid, and slow data transmission rate, respectively) as illustrated with respect to mobile terminal 230a. The cell coverage of the mobile terminals 230b, 230c, and conventional mobile terminal 231 are not shown in FIG. 2 for sake of clarity. However, in order to maintain proper communication with a particular base station 210, 211, or 215 it is not enough that the mobile terminal be within the cell area coverage of the base station, but rather, the base station must also be within the cell area coverage of the mobile terminal as will be appreciated.

For example, in this particular embodiment, mobile terminal 230a is shown to be within the cell area coverage 218 of base station 211. However, in order to maintain proper bidirectional communication and register with base station 211, the base station 211 must also be within the cell area coverage of the mobile terminal 230a. As shown, at the fastest data transmission rate, mobile terminal 230a only has transmission capabilities within cell 242 which is not sufficient to communicate with base station 211. Therefore, the mobile terminal 230a must communicate at the mid or slow rate corresponding to cell coverage 244, 246 respectively. At these rates, the base station 211 falls within the transmission range of mobile terminal 230a. Thus, registration and communication can be readily maintained.

In many instances, a mobile terminal may register with a wireless base station 215 in order to gain access to the network 250. Similar to that discussed above, both the mobile terminal and the wireless base station must be within each others transmission range in order to allow for proper communication to take place. As is discussed below, each wireless base station 215 will form a permanent path to the network 250 through which all communication with registered mobile terminals take place. In this particular embodiment, wireless base station 215b has formed a permanent path to the network 250 through wireless base station 215a and base station 210. Thus, if mobile terminal 230c is registered with wireless base station 215b then all communication between the mobile terminal 230c and the network 250 will follow this path.

Transmissions between the devices in the cellular communication system 200 preferably occur in a packet format 300 (FIG. 3) using Spread Spectrum wireless communication techniques, as described in the Background section. Although this particular embodiment describes a Direct Sequence Spread Spectrum (DSSS), a frequency hopping system or a hybrid system using direct sequence or frequency could be readily employed. In order to accommodate varying cell sizes in a DSSS system as discussed above, the mobile terminals 230 and the base stations 210, 215 are capable of varying PN code parameters such as PN code length and chipping rates, and modulation complexity for example. The effect of varying each of these parameters will now be discussed in conjunction with their effect on cell size and overall system performance.

As indicated previously in the background section, a longer PN code length results in a higher processing gain and correspondingly increases a communication range between a mobile terminal 230 and a base station 210, 215. On one hand, a high processing gain may advantageously be utilized to permit data transmission between the mobile terminal 230 and the base station 210, 215 that would otherwise be out of the communication range. However, the increased communication range afforded by the high processing gain results in a reduced data transmission rate (where the data transmission rate is measured in terms of original data bits transmitted per unit time). On the other hand, a lower processing gain may be utilized to achieve a faster data transmission rate between a mobile terminal 230 and a base station 210, 215 which are nearby. The lower processing gain, however, reduces the communication range between the mobile terminal 230 and the base station 210, 215.

The chipping rate refers to the rate at which chips are transmitted by the system component sending a data transmission. A system component receiving the data transmission must receive, demodulate and despread the PN coded chip sequence at the chipping rate utilized by the sending component. At a higher chipping rate, the receiver system is allotted a smaller amount of time to receive, demodulate and despread the chip sequence. As the chipping rate increases so to will the error rate. Thus, a higher chipping rate effectively reduces the communication range. Conversely, decreasing the chipping rate increases the communication range.

In addition to modifying the PN code length and chipping rate, the modulation complexity may be varied. A BPSK modulation scheme, which provides for modulating the carrier to one of two phases, may be used to transmit one bit at a time over the wireless communication link, while a QPSK modulation scheme, which provides for modulating the carrier to one of four phases may be used to transmit data at a faster rate, two bits at a time, over the link. While QPSK will result in a faster data rate, it is more sensitive to noise and more errors may occur because the receiver must operate within a 90 degree phase decision angle rather than 180 degrees associated with BPSK. Thus, a greater transmission range can also be accomplished by using a BPSK modulation complexity over a QPSK modulation complexity since BPSK modulation has a higher tolerance to noise and allows for better opportunities to decode each bit.

While the rate/range tradeoff still applies to each individual transmission, the system 200 allows an individual mobile terminal 230 and an individual base station 210, 215 to optimize the processing gain and data transmission rate tradeoff for a given data transmission. This overcomes the cell size/throughput tradeoff limitation. It will be apparent that the system 200, by providing the base stations 210, 215 and the mobile terminals 230 with the ability to dynamically modify the PN code length, chipping rate, and/or modulation complexity effectively provides a base station 210, 215 with an adjustable cell size as indicated in FIG. 2. For instance, the cell size indicated by the curved line 212 of base station 210 would correspond to a data transmission characterized by a low processing gain and a high data transmission rate. The cell size indicated by the curved line 214 would correspond to a data transmission characterized by an intermediate processing gain and intermediate data transmission rate. Finally, the cell size indicated by the curved line 216 would correspond to a data transmission characterized by a high processing gain and a low data transmission rate. The present system 200 can have exceptionally large cells while only sacrificing throughput to the extent mobile terminals on the fringe of respective base station cells require the higher processing gain for error free communication.

Optimization of a wireless communication link occurs when all parameters are set such that data is transmitted at the fastest possible rate to the system backbone 260 at or below an "acceptable" error rate given the capabilities of the communicating system components, the range of data transmission and the ambient noise conditions. However, in obtaining this optimum setting, tradeoffs will occur as discussed above.

One advantage of dynamically altering the communication parameters to optimize performance is that mobile terminals 230 close to a base station 210, 215 may transmit data rapidly thereby reducing total air time usage. Additionally, fewer base stations will likely be needed to cover a given service region, thereby reducing the overall cost associated with the cellular communication system. Without the ability to dynamically alter communication parameters, the base station cell sizes remain constant. Thus, it will be necessary to ensure that there are a sufficient number of base stations located so as to cover the entire service region. It should be evident in such situations that, unless each base station is preset to transmit at its lowest possible data communication rate, the base station cell size will be less than a cell size defined by its maximum range capabilities. However, given the rate/range tradeoff (as discussed above), it would be extremely inefficient usage of air time to set the slowest rate on most base stations, which consequently would correspond to a need for a greater number of base stations in order to cover any given area. Additionally, by having this dynamic altering ability, base stations may be able to adjust for additional noise introduced into their communicating area. Without this ability, newly introduced noise could result in reduced range or "dead spots" where a mobile terminal can no longer communicate with any preexisting base station.

In order to allow for optimization of a cellular communication system, each base station 210, 215 in the exemplary embodiment is capable of communicating with a plurality of mobile terminals 230 at three different data rates, fast, mid and slow. In other embodiments, a variety of rates variably adjustable between the slowest and fastest rate could be used. Because of the rate/range tradeoff, the fast rate can only be used to communicate with mobile terminals 230 located relatively close to a base station 210, 215. A cell 212 (FIG. 2), for example, in which the fast rate can be used is referred to as the near zone. The mid data rate can be used to communicate with mobile terminals 230 which are more distant from the base station 210, 215. For example, in cell 214 the mid data rate can be used, but not the fast data rate. Finally, a mobile terminal 230 that is even more distant from a base station 210, 215 requires data transmission at the slow data rate.

In this particular embodiment, the fast data rate includes use of an 11 chip PN code and a QPSK modulation complexity. The chipping rate can be set to 11 MHZ to provide a 2 MB/sec data rate. The mid data rate includes use of an 11 chip code and a BPSK modulation complexity. An 11 MHZ chipping rate will provide a 1 MB/sec data rate. The slow data rate includes a 22 chip code and a BPSK modulation complexity. The 11 MHZ chipping rate provides a ½ MB/sec data rate. Table 1 below summarizes such parameters. It will be appreciated, of course, that such values are exemplary and are not intended to limit the scope of the invention.

TABLE I

| Data Rate | PN Code Length (chips) | Chip Rate (MHZ) | Modulation |
| --- | --- | --- | --- |
| Fast | 11 | 11 | QPSK |
| Mid | 11 | 11 | BPSK |
| Slow | 22 | 11 | BPSK |

To eliminate the need for each system component (mobile terminal 230 or base station 210, 215) to have a receiver system capable of simultaneously listening for data transmitted at all three data rates, a network protocol provides for a more simplified receiver system. The preferred network protocol incorporates a combination of positive and negative acknowledgment signals used by a responding component. The acknowledgment signals provide information to a transmitting component that allows the transmitting component to change its parameters in a manner which optimizes the communication link. A positive acknowledgment signal is returned to the transmitting component when the receiving component properly received all of the transmitted data. Thus, a positive acknowledgment signal informs the transmitting component that its current transmitting parameter settings are sufficient to allow for communication. However, based on the information given in the acknowledgment, more optimal settings may be available. A negative acknowledgment signal is used when the receiving component only partially received the transmitted data. A negative acknowledgment signal informs the transmitting component that its current transmitting parameter settings are not sufficient to allow for proper communication. However, the transmitting component can use the information given in this acknowledgment signal to change its parameters (if possible) to allow for complete and optimal communication to take place.

In the preferred embodiment of this system 200, it is desirable to enable the mobile terminal 230 to choose the data rate or data rates used for the packet. Base stations 210 hardwired to the system backbone 260 and wireless base stations 215, are programmed to respond to the mobile terminal at the same rate or rates. Therefore, the mobile terminal receiver system will be able to anticipate the rate of the incoming signals at any one time.

The base station 210, 215, on the other hand, will not know which data rate the mobile terminal 230 will choose, or which of several mobile terminals will transmit a packet. Therefore, the base station 210, 215 would ordinarily be required to simultaneously be able to detect all three data rates. To provide for a more simplified base station 210, 215 receiver system, however, the network protocol requires all packets to begin with a header 302 (FIG. 3A) transmitted at the mid or slow data rate. Therefore, the base station 210, 215 need only listen for the mid or slow rates as is explained more fully below in connection with FIGS. 3B and 3C.

Figure 3A:
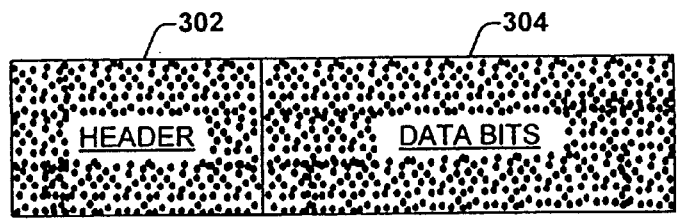
FIG. 3A is a schematic representation of a data packet including a header portion and a data portion.

Referring to FIG. 3A, each packet 300 preferably includes overhead bits in the form of a header 302 and a plurality of data bits 304. While the entire packet 300 may be transmitted at the fast, mid or slow rate, the protocol of this specific embodiment provides for the header to be transferred at the mid or slow rate while the data portion is transferred at the fast, mid or slow rates. Any combination of these varying rates in a single packet may be referred to as a packet rate. The header 302 may include receiver system setup data signifying the data rate at which the data bits 304 will be transmitted. The packet 300 may contain synchronization bits (not shown) between the header and data portion to provide the receiver time to reconfigure itself to the data transmission rate for the data bits 304.

A conventional mobile terminal 231 which cannot change its parameters need only be configured in the exemplary embodiment to operate at the mid rates by preselecting its one non-adjustable PN chip code length characteristic value to 11 chips and its modulation complexity to BPSK. Accordingly, the header and data of a packet 300 are always transmitted by the mobile terminal 231 to the base station at the mid data rates.

Because the mobile terminals 230 may transmit headers 302 of the packets 300 to the base station 210, 215 at either the mid rate or the slow rate the modulation complexity of the header is always BPSK. Therefore, the receiver system of base stations that communicate with the mobile terminals 230 are configured initially to receive BPSK signals, in that it distinguishes between the two possible phases of the carrier frequency. However, the mid data rate has an 11 chip PN code length and the slow data rate has a 22 chip PN code length. Therefore, the base station must be able to determine which of the two PN codes is in use to determine whether the header 302 is being transmitted at the mid or slow data rates. Consequently, as described below in connection with FIG. 3C the base station 210 includes at least two PN decoders serving as correlation channels, one to correlate when an 11 chip PN code length is used and the second configured to detect and decode a 22 chip PN code length. In response to a header 302 indicating that the accompanying data bits 304 of the packet 300 are to be communicated using the fast data rate, the base station 210 reconfigures to receive QPSK modulation and the incoming data is correlated with an 11 chip PN code as discussed below.

Wireless base stations 215 which do not directly communicate with mobile terminals generally do not have to continuously be able to detect different data rates. However, due to their start up procedure, as is discussed below, they are configured so as to be able to receive information at different rates. Further, wireless base stations such as base station 215a in FIG. 2 may optionally be configured to communicate with mobile terminals as well as serve as an intermediate link between other wireless base stations and the network. For instance, a manual switch (not shown) may be attached to the wireless base station and control whether the wireless base station responds to a request to register signal sent from a mobile terminal. Alternatively, the wireless base station could be configured such that a program stored in the memory of the wireless base station allows registration with mobile terminals only when the wireless base station is also able to effectively support loading from other wireless base stations which may have registered with it. The registration process between a wireless base station 215 and another base station 210, 211 or a wireless base station 215 and a mobile terminal 230, 231 is discussed below.

Regardless of whether or not a wireless base station is configured to permit registration with mobile terminals, the communication path between the wireless base station 215 and the other base stations 210, 211 is a fixed path. Therefore, in order to set up a permanent communication path, at start up each wireless base station sends out a request to register with a base station closer to the system backbone. The request to register is initially sent at the fastest speed. If a response is received at the fast rate, the wireless base station will establish a permanent communication link with the responding base station. If no response is received, the wireless base station will send out a request to register at a slower speed. This process will continue until a permanent communication link is created. If at any time, more then one base station responds to the wireless base station's request to register, the wireless base station will select one of the responding base stations to be its permanent link to the backbone based on predetermined criteria such as system load, for example.

It should be readily understood that there can be several embodiments of the mobile terminal 230 of the present invention. Different embodiments may have different limitations on the parameters used to vary the processing gain. For example, a first embodiment may be capable of varying PN code length and modulation complexity in accordance with all three data rates. In another more limited embodiment, the mobile terminal 230 may be capable of varying the modulation complexity but not the chip PN code length. When such embodiment is set for an 11 chip PN code, it is capable of the fast and mid data rates.

The network of this invention can also support conventional base stations 211 and base stations 210, 215 with limited ability to alter code length or modulation complexity. The capabilities of both the mobile terminal 230 and the base station 210, 215 limit the data rates that the mobile terminal 230 can choose. The base station may include its rate capabilities in the "OK to register" packet, often referred to as the "router identification" packet, and the mobile terminal 230 will comply with the base station's rate limitations when choosing a data rate.

In summary, the preferred embodiment of the cellular communication system 200 of the present invention utilizes a packet structure with a mid or slow data rate used for the header 302 and a fast, mid or slow data transmission rate used for the data bit portion 304 of the packet 300. The mobile terminal 230 chooses the packet data transmission rates and the base station response packet will use the same rates. At start up, wireless base stations 215 establish a permanent link to the system backbone 260 and maintain constant optimal communication with hardwired base stations 210 or other wireless base stations 215 situated closer to the backbone 260.

Figure 3B:
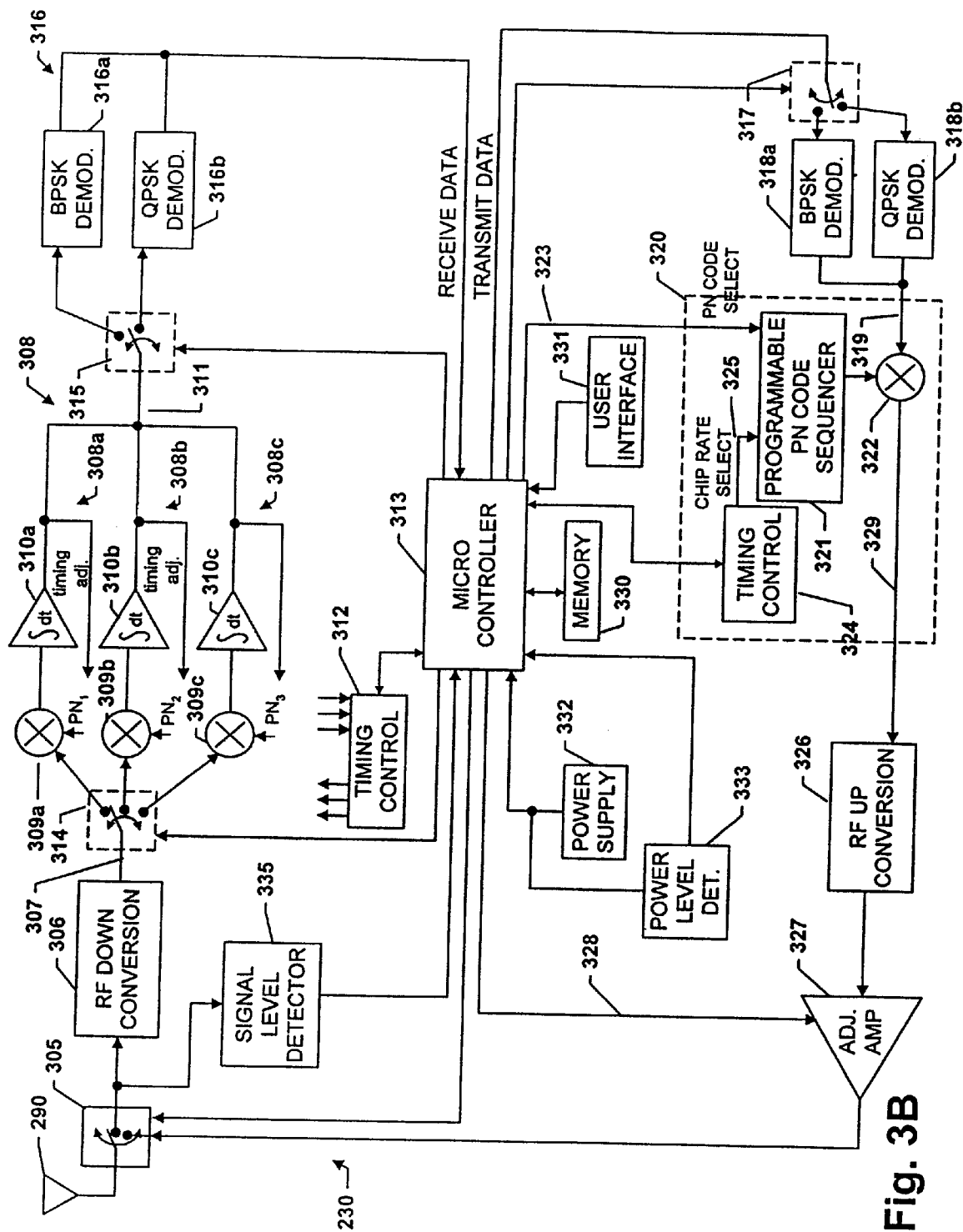
FIG. 3B is a detailed block diagram of an exemplary embodiment of a mobile terminal in accordance with the present invention.

Referring now to FIG. 3B, a detailed block diagram of an exemplary embodiment of a mobile terminal 230 is shown in accordance with the present invention. The mobile terminal 230 includes the aforementioned antenna 290 which is used both for transmitting and receiving data. The antenna 290 is connected to the antenna terminal of a receive/transmit switch 305. The receive/transmit switch 305 can be any type switch for switching the antenna 290 between a transmitting mode and a receiving mode, for example a PIN-diode based single pole-double throw (SPDT) type switch as is known. Signals received by the antenna 290 are coupled via the switch 305 to the input of an RF down-conversion circuit 306. The RF down-conversion circuit 306 typically includes a mixer and can be of any known suitable design for outputting the data signal onto line 307.

The mobile terminal 230 includes a bank 308 of PN code spread spectrum decoders, each respectively being of conventional design. In the exemplary embodiment, the bank 308 includes PN code spread spectrum decoders 308a, 308b and 308c each respectively configured for decoding or despreading signals received at the fast, mid and slow data rates. For example, decoder 308a is configured to decode PN coded data having an 11 chip PN code length and a chipping rate of 11 MHZ. The decoder 308a generally includes a mixer 309a which mixes the received PN coded data with a signal $PN_1$ representing the 11 chip PN code at the 11 MHZ chipping rate. The output of the mixer 309a is provided to an integrator 310a which integrates the signal to produce a decoded data output on line 311. The output of the integrator 310a is also fed back to a timing controller 312 which produces the appropriate decoding signal PN1 and adjusts the timing thereof based on the output of the integrator 310a in order to obtain optimum correlation with the data received by the decoder.

Similarly, the decoder 308b is configured for receiving data transmitted at the mid data rate. Since the mid data rate in the exemplary embodiment also uses a PN code length of 11 and a chipping rate of 11 MHZ, the construction of the decoder 308b can be identical to that of the decoder 308a. In fact, decoders 308a and 308b in this particular embodiment can be one and the same as will be appreciated. Nevertheless, the decoder 308b similarly includes a mixer 309b, an integrator 310b, and receives an appropriate timing signal $PN_2$ from the timing controller 312. The decoder 308c also includes a mixer 309c and an integrator 310c, but is configured to receive a timing signal $PN_3$ from the timing controller 312 corresponding to a PN code length of 22 at a chipping rate of 11 MHZ.

A microcontroller 313 included in the mobile terminal 230 is programmed to carry out the various control and processing operations described herein. For example, the microcontroller 313 controls a switch 314 which determines whether the mobile terminal 230 is set to receive data at the fast, mid or slow data rate by respectively coupling the PN coded signal on line 307 to any of decoders 308a–308c. Similarly, the microcontroller 313 controls a switch 315 which determines what type of further demodulation is performed on the data signal. More specifically, the mobile terminal includes an array of selectable demodulators 316. Demodulators 316a and 316b are conventional and perform BPSK and QPSK demodulation, respectively. Depending on whether the mobile terminal 230 is to be set to receive data at the fast, mid or slow data transmission rate, the microcontroller 313 adjusts the position of switch 315 accordingly. If the mobile terminal 230 intends to receive data at the fast data rate, the switch 315 couples the output from the decoder bank 308 to QPSK demodulator 316b. On the other hand, if the mobile terminal 230 is to receive data at the mid or slow data rates, the switch 315 connects the signal on line 311 to the BPSK demodulator 316a. The data which is output from the demodulators 316a, 316b is then provided on the RECEIVE DATA line to the microcontroller 313 for appropriate processing based on the given application.

In order for the mobile terminal 230 to transmit data, the microcontroller 313 provides data to be transmitted onto a TRANSMIT DATA line. The TRANSMIT DATA line is connected to a controllable switch 317 which determines the manner in which the transmit data is modulated. More specifically, the mobile terminal 230 includes a bank of modulators 318 including BPSK and QPSK modulators 318a and 318b, respectively. In the event data is to be transmitted by the mobile terminal 230 at the fast rate, the microcontroller 313 causes the switch 317 to couple the transmit data to the input of the QPSK modulator 318b. Alternatively, if the data is to be transmitted at the mid or slow rates, the data is connected to the input of the BPSK modulator 318a via the switch 317.

The BPSK or QPSK modulated data from modulators 318a, 318b is output onto line 319 which serves as the input for a programmable PN encoder 320 included in the mobile terminal 230. Specifically, the PN encoder 320 includes a programmable PN code sequencer 321 which provides the appropriate PN code for mixing (via mixer 322) with the data on line 319 to be PN code modulated. The programmable PN code sequencer 321 can be any digital logic circuit designed to generate a PN code sequence at the desired chip length and chipping rate. The programmable PN code sequencer 321 of this embodiment utilizes a shift register to create the necessary PN codes. The programmable PN code sequencer 321 receives as control inputs a PN code select signal from the microcontroller 313 via line 323, and a chip rate select signal provided from a timing controller 324 via line 329. The PN code select signal defines the particular PN code to be used which, in the exemplary embodiment is either an 11 chip or 22 chip code. The chip rate select signal from the timing controller 324 determines the chipping rate of the PN code sequence produced by the sequencer 321. In the exemplary embodiment, the chip rate select signal causes the PN code sequence output from the programmable PN code sequencer 321 to have a chipping rate of 11 MHZ at all times, but another embodiment could include varying the chipping rate as will be appreciated. The timing controller 324, like the timing controller 312, is connected to the microcontroller 313 and is controlled thereby.

Accordingly, when the mobile terminal 230 transmits data at the fast or mid rates, the microcontroller 313 provides a PN code select signal on line 323 indicating that the programmable PN code sequencer 321 is to generate a PN code sequence having a PN code length of 11 and a chipping rate of 11 MHZ. When the mobile terminal 230 transmits data at the slow rate, the microcontroller 313 provides a PN code select signal to the programmable PN code sequencer 321 indicating that the programmable PN code sequencer 321 is to generate a PN code sequence having a PN code length of 22 and a chipping rate of 11 MHZ. The output of the programmable PN code sequencer 321 is provided to mixer 322 where it is mixed with the data on line 319 to produce a PN spread spectrum signal on line 329. The spread spectrum signal is then input to a conventional RF up-conversion circuit 326 which mixes the signal onto an RF carrier prior to being provided to an RF output amplifier 327. The RF signal is amplified by the amplifier 327, and the output of the amplifier is provided to the transmit terminal of the switch 305. During a transmit mode, the microcontroller 313 causes the switch 305 to couple the output of the amplifier 327 to the antenna 290 so that the signal is transmitted. During the receive mode, of course, the switch 305 is controlled by the microcontroller 313 to couple the signal from the antenna 290 to the RF down conversion circuit 306.

The RF output amplifier 327 in the preferred embodiment has an adjustable gain which is controlled by the microcontroller 313 via line 328. In the event the microcontroller 313 elects to increase the power level at which the RF signal is transmitted from the antenna 290, the microcontroller 313 can increase the gain of the amplifier 327. Conversely, if the microcontroller 313 elects to reduce the transmit power level, the microcontroller 313 reduces the gain of the amplifier 327.

In addition to the above described receiver and transmitter systems, the mobile terminal 230 includes a memory 330 which stores, for example, code which is executed by the microcontroller 313 for carrying out the functions described herein. It will be readily apparent to those having ordinary skill in the art of microprocessor programming how the microcontroller 313 can be programmed in order to carry out such functions based on the description provided herein. Furthermore, the memory 330 may include application code, data, etc., as is conventional. The mobile terminal 230 also includes a user input 331 such as a keypad, touch display, LCD, etc., which can be used for inputting or viewing information.

The mobile terminal 230 includes a power supply 332 which provides the power for operating the mobile terminal 230. Typically, the power supply 332 consists of a battery pack which is either replaceable or rechargeable. The output of the power supply 332 is monitored by a power level detector 333 which measures the voltage and/or current delivered by the power supply 332 to the mobile terminal 230 In the exemplary embodiment, the power level detector 333 detects if the voltage provided by the power supply 332 falls below a predetermined threshold. If this occurs, the power level detector 333 provides a signal to the microcontroller 313 to inform the microcontroller 313 that the power level is low. The microcontroller 313 may then take predetermined action such as reducing the transmit power level by reducing the gain of the amplifier 327, thus reducing power consumption.

Furthermore, the mobile terminal 230 includes a signal level detector circuit 335 which detects the signal level of the signal received via the antenna 290 from a base station, for example. In the preferred embodiment, the signal level detector 335 is designed to provide an output signal to the microcontroller 313 in the event the signal level of the received signal exceeds a predetermined level (thereby indicating the base station is in close proximity). Upon receiving such a signal, the microcontroller 313 may elect to reduce the gain of the amplifier 327 for transmitting information back to the base station. This enables the mobile terminal 230 to conserve power and/or avoid saturating the front end of the base station 210.

Figure 3C:
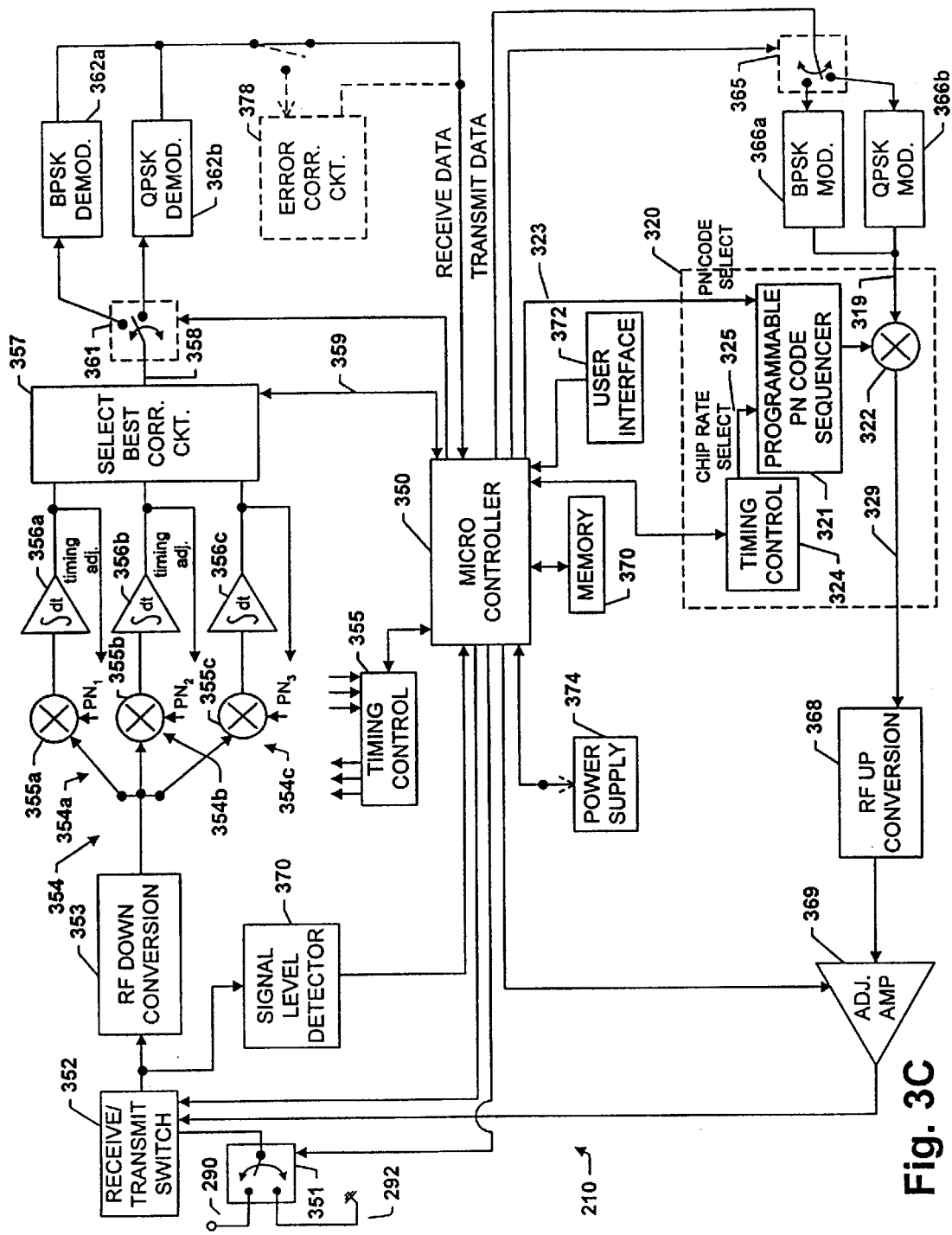
FIG. 3C is a detailed block diagram of an exemplary embodiment of a base station in accordance with the present invention.

Regarding the base station 210, FIG. 3C shows an exemplary embodiment having various aspects of the present invention. The base station 210 is driven by a microcontroller generally designated 350. As discussed above, the base station 210 may include two or more different antennas 290 and 292. Additionally, the base station 210 may include antenna selection circuitry which in this embodiment is generally represented by a microcomputer 350, and a switch 351. The microcontroller 350 determines which antenna is utilized during any particular transmission or reception by way of the switch 351 controlled by the microcontroller 350. The state of the switch 351 determines which of the antennas 290,292 is selectively coupled to the antenna terminal of the receive/transmit switch 352. The receive/transmit switch 352 is identical in operation to the switch 305 described in connection with the mobile terminal in FIG. 3B. The output of the receive/transmit switch 352, i.e., the receive terminal, is connected to the input of an RF down-conversion circuit 353. The operation of the RF down-conversion circuit 353 is identical to that of the corresponding RF down-conversion circuit 306 in the mobile terminal 230.

Thus, RF signals which are received by the base station 210 from a mobile unit 230 are received via either antenna 290 or 292, and are input to the RF down-conversion circuit 353 via the receive/transmit switch 352. Like the transmitter system in the mobile terminal 230, the base station includes a bank 354 of PN code spread spectrum decoders 354a–354c. Each are of conventional design and together with timing controller 355 are identical in operation to the decoders 308a–308c and timing controller 312 in the mobile terminal 230, respectively. In other words, the decoders 354a and 354b are each configured according to conventional techniques to decode a PN coded spread spectrum signal having a PN code length of 11 and a chipping rate of 11 MHZ. Decoder 354c is configured to decode a PN coded signal having a PN code length of 22 and a chipping rate of 11 MHZ. Each decoder generally includes a mixer 355 and an integrator 356, and receives appropriate timing signals (PN1–PN3) and control via the timing controller 355.

Unlike the mobile terminal 230, however, the transmitter system of the base station 210 does not include a switch for selecting which of the decoders 354a–354c receive the output from the RF down-conversion circuit 353. This is because in the exemplary embodiment it is predetermined that the mobile terminal 230 will know that data validly received from the base station will initially be transmitted at a particular rate as discussed more fully below. Hence, the microcontroller 313 in the mobile terminal 230 knows initially how to set switches 314 and 315 such that the data is decoded in accordance with the particular data rate. The base station 210, on the other hand, does not always know the transmission rate at which data will be received. Consequently, the output from the RF down-conversion circuit 353 is input to each of the decoders 354a–354c in parallel. The outputs of each of the decoders 354a–354c are provided to a circuit 357 for selecting the output from the decoders 354a–354c which exhibits the best correlation between the signal which is received by the decoder and the particular PN code sequence and rate for which it is designed. As will be appreciated by those having ordinary skill in the art, the decoder which receives the PN coded spread spectrum signal having a data transmission rate corresponding to the that for which the decoder is designed, will exhibit the best correlation at its output. The circuit 357 can be a logic array and/or a switch or multiplexer which automatically couples the output of the decoder 354a–354c exhibiting the best correlation onto line 358. In addition, the circuit 357 is designed to provide an output to the microcontroller 350 via line 359 indicating the PN code length and the chipping rate of the received signal by virtue of knowing which decoder 354a–354c produced the best correlation. In other words, if the decoder 354a provides the best correlation, it is known that the data transmission rate of the received signal is fast. If the decoder 354b provides the best correlation, it is known that the data transmission rate is mid. Finally, if the decoder 354c provides the best correlation, it is known that the data transmission rate is slow.

The output on line 358 from the circuit 357 is connected to the pole of switch 361. The microcontroller 350 controls the position of the switch 361 so as to determine whether the decoded spread spectrum signal on line 358 is input to a BPSK demodulator 362a or a QPSK demodulator 362b. Thus, if the signal received from the mobile terminal is at the mid or slow data rate as determined by the circuit 357 initially at least, the microcontroller 350 causes the switch to couple the signal on line 358 to the input of the BPSK demodulator 362a. On the other hand, if the signal received from the mobile terminal is at the fast rate, the microcontroller 350 causes the switch 361 to couple the signal on line 358 to the input of the QPSK demodulator 362b. The BPSK and QPSK demodulators 362a and 362b, respectively, are conventional in design. The output of each demodulator 362a, 362b is connected to a RECEIVE DATA line which provides the demodulated data to the data input of the microcontroller 350.

It will be appreciated that in the present embodiment, decoders 354a and 354b for the fast and mid data rates are each configured for processing a PN code having a code length of 11 and a chipping rate of 11 MHZ. Hence, whether the data received by the base station 210 has been transmitted at the fast rate or the mid rate, the outputs of both decoders 354a and 354b should show good correlation. Consequently, the decoders 354a and 354b can either be combined into a common unit or the circuit 357 can be designed to select one of the two by default in the event both show good correlation. In either case, however, the information provided to the microcontroller 350 from the circuit 357 via line 359 distinguishes only whether the data transmission is at the slow rate or is at a mid/fast rate. The circuit 357 cannot distinguish between the mid and fast rates based only on the outputs of the decoders 354a and 354b. As a result, the "normal" or default position of the switch 361 is in the position whereby the signal on line 358 is coupled to the input of the BPSK demodulator 362a. According to the exemplary embodiment as described herein, the mobile terminals are configured to initially transmit the header portion 302 of the packet at the mid or slow data transmission rate. Consequently, the data will be correctly demodulated. Thereafter, information contained in the data packet received from the mobile terminal will provide the microcontroller 350 with information as to the appropriate data transmission rate.

The transmitter system of the base station 210 is functionally equivalent to the transmitter system of the mobile terminal 230 described above. In other words, data to be transmitted is output from the microcontroller 350 onto the TRANSMIT DATA line. The data on the TRANSMIT DATA line is selectively connected via switch 365 to either the input of BPSK modulator 366a or the input of QPSK modulator 366b. In the event data is to be transmitted at the fast rate, the microcontroller 350 causes the switch 365 to couple the data to be transmitted to the QPSK modulator 366b. If data is to be transmitted at the mid or slow rates, the microcontroller 350 causes the switch 365 to couple the data on the TRANSMIT DATA line to the BPSK modulator 366a.

Like the mobile terminal 230, the base station 210 includes a programmable PN encoder 320 which is identical in construction and operation. Consequently, the details thereof will not be repeated for sake of brevity. It suffices to say that when the base station 210 elects to transmit data at the fast or rate, the microcontroller 350 provides to the programmable PN code sequencer 321 a PN code select signal identifying the PN code with a code length of 11. In addition, the microcontroller 350 provides a chip rate select signal via the timing controller 324 to the programmable PN code sequencer 321, the chip rate select signal being representative of a chipping rate of 11 MHZ. When the base station is to transmit data at the slow rate, the microcontroller 350 provides the same chip rate select signal representative of 11 MHZ; however, the PN code select signal provided by the microcontroller 350 has a code length of 22 rather than 11. The programmable PN code sequencer 321, in turn, generates a PN code sequence with the appropriate PN code and chipping rate which is then mixed via the mixer 322 with the modulated outputs from the BPSK and QPSK modulators 366a, 366b.

The resultant PN spread spectrum signal is then output on line 329 so as to be an input to the RF up-conversion circuit 368. Like the RF up-conversion circuit 326 in the mobile terminal, the circuit 368 is conventional in design and mixes the PN spread spectrum signal onto an RF carrier. The output of the RF up-conversion circuit 326 is provided to the input of an adjustable gain RF output amplifier 369. The output of the amplifier 326 is coupled to the transmit terminal of the receive/transmit switch 352 such that the spread spectrum RF signal can be transmitted via one of the antennas 290 or 292.

The gain of the RF output amplifier 369 is controlled by the microcontroller 350 so as to increase or decrease the transmit power level of the base station 210. For example, the base station 210 includes a signal level detector circuit 370. The signal level detector circuit 370 detects the level of the signal received via the output of the receive/transmit switch 352 for example. If the signal level is below a predetermined threshold, for example, indicating that the mobile terminal is far away, the signal level detector circuit 370 sends a "low power" control signal to the microcontroller 350. The microcontroller 350 may in turn increase the gain of the amplifier 369. In addition, or in the alternative, the microcontroller 350 may switch from the antenna 290 to the higher gain antenna 292 via the switch 351. If the signal level detected by the signal level detector circuit 370 is above another predetermined threshold, thereby indicating that the mobile terminal is close, the signal level detector circuit 370 provides a "high power" control signal to the microcontroller 350. In response, the microcontroller 350 can reduce the gain of the RF output amplifier 369 so as to avoid the possibility of saturating the front end of the mobile terminal. In addition, or in the alternative, the microcontroller 350 may cause the base station 210 to switch from a higher gain antenna to a lower gain antenna via the switch 351.

The base station 210 also includes a memory 370 serving as system memory for the microcontroller 350 and which is substantially identical in function to the memory 330 described above in connection with the mobile terminal. In addition, the base station may include a user interface 372 such as a keypad, display, etc.

Also included in the base station 210 is a power supply 374 for providing the necessary power for operating the device. In the conventional case, the power supply can be based on power received from conventional power lines (not shown). However, it will be appreciated that all or part of the features shown in FIG. 3C also apply to the above discussed wireless base stations 215. Hence the power supply 374 can also be a solar powered, rechargeable battery based system as is discussed below in more detail in relation to FIG. 6B. Furthermore, in another embodiment of the invention, the base station includes an error correction circuit as part of the receiver system as represented by phantom box 378. Particularly in the case where the base station is a wireless base station 215, it is desirable to include an error correction circuit 378 for reducing errors in the received data. The circuit 378 can be of conventional design, but it is preferably included in wireless base stations 215 which are used as repeater stations. As is discussed more fully below, it is significant that wireless base stations 215 which serve as repeaters include such an error correction circuit 378. In this manner, the total number of errors which occur during multiple hops can be decreased.

Although the above embodiments of the mobile terminal 230 and the base stations 210,215 where described as using the same chipping rate regardless of whether the data is being transmitted at a fast, mid or slow rate, it will be appreciated that another embodiment may involve adjusting the chipping rates via the appropriate timing controller. Similarly, although the above embodiments are designed primarily using discrete hardware components, it will be appreciated that the majority of functions can be carried out primarily via software without departing from the scope of the invention. Also, although the receiver system in both the mobile terminal 230 and the base station 210,215 was described as a bank of decoders operating in parallel, it will be appreciated that another embodiment of the invention may use a serial type receiver which adjusts the timing of the PN signal provided to the mixer until a valid signal is found.

Furthermore, the exemplary embodiment utilized BPSK and QPSK modulation techniques. Nevertheless, other modulation techniques can be substituted or added as conditions dictate. For example, a QAM modulation scheme may be utilized in addition to BPSK and QPSK. Hence, the present invention is not intended to be limited to any particular combination necessarily. FIGS. 7A–7E and 8A–8E discussed below illustrate additional embodiments of the present invention.

The above discussion of FIGS. 3B and 3C describes in detail exemplary hardware configurations of the mobile terminals 230 and base stations 210,215. The following description explains in more detail the relevant protocols involved.

Figure 4A:
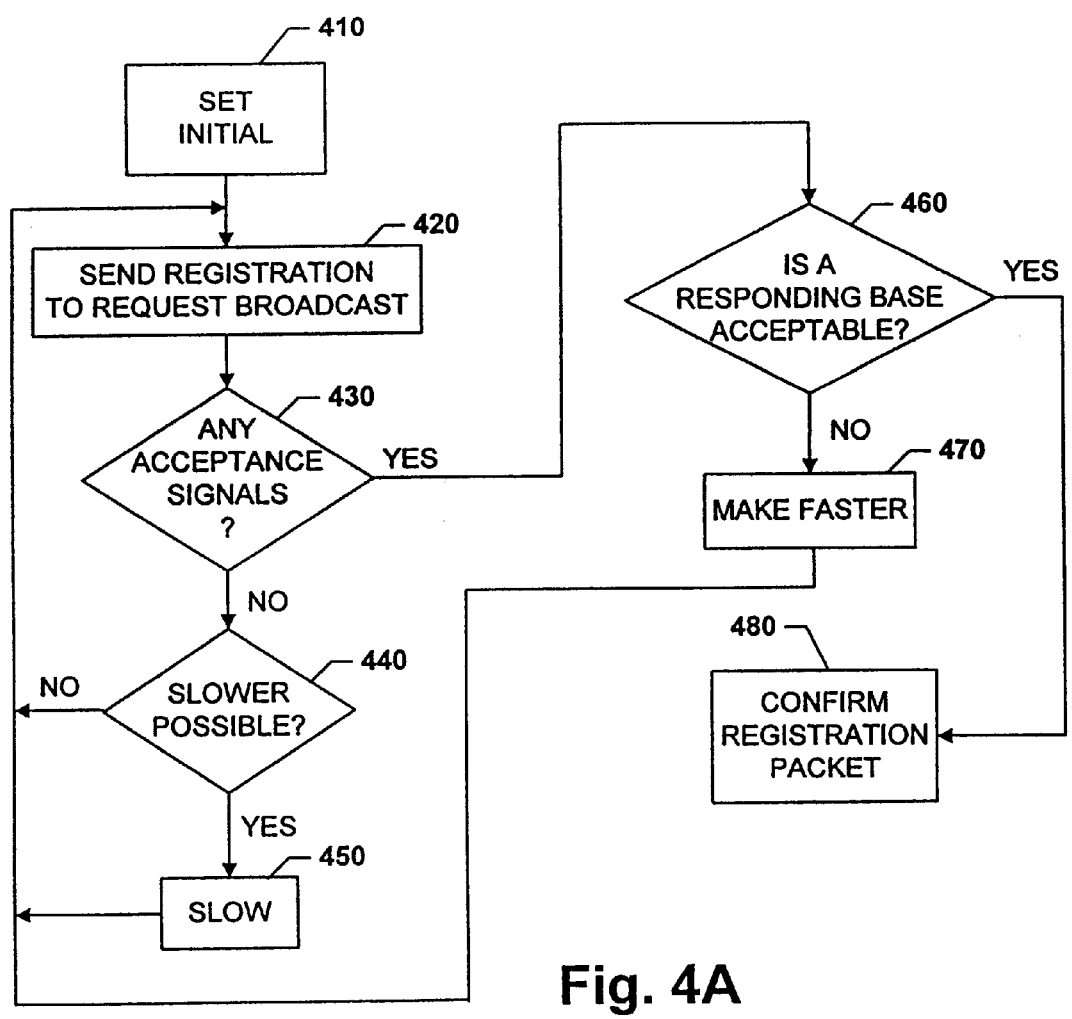
FIG. 4A is a flowchart illustrating a mobile terminal registering with and ascertaining a data communications rate for communicating with a base station.
Figure 4B:
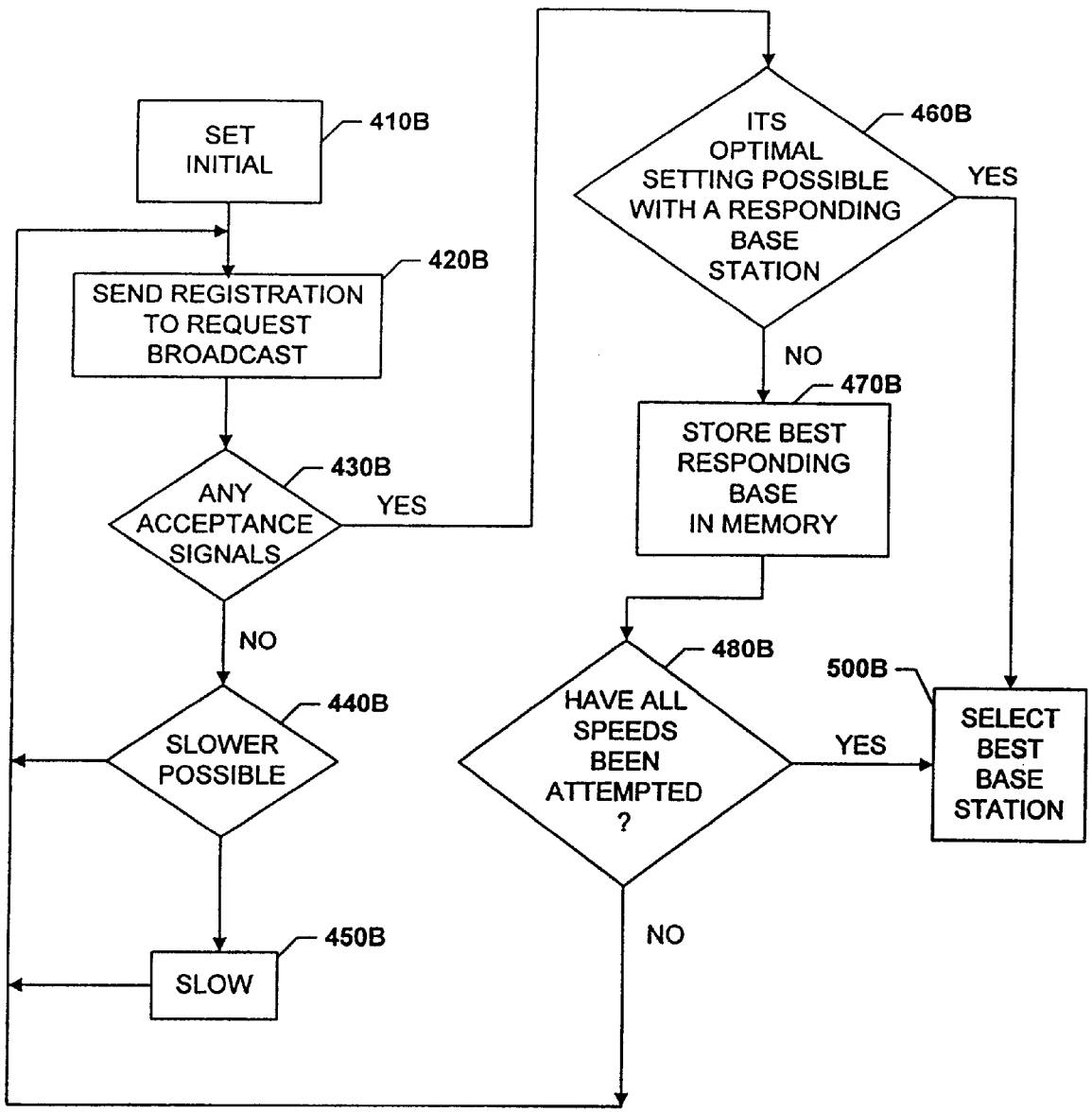
FIG. 4B is the process as described in FIG. 4, wherein at least one of the base stations that the mobile terminal is attempting to register with is a wireless base station.

FIG. 4A is a flowchart that represents the process by which a mobile terminal 230 registers with a base station 210 hardwired to the backbone and selects an initial data rate to be used for communicating with the base station. The FIG. 4A flow chart is based on situations where all responding base stations 210 are hardwired to the backbone 260 while FIG. 4B shows the steps taken when one or more responding base stations are wireless. At step 410 in FIG. 4A, the mobile terminal 230 sets its initial rate at which it will attempt to register with one of the base stations. The initial rate set may simply default to a fast rate or be set in accordance with the rate at which previous communications have occurred or be set by any other criteria including a transmission rate known to be within the capability of certain base stations. At step 420, the mobile terminal 230 broadcasts a request to register a packet known as the "find router" packet to any base station 210, 211, 215 available to receive the broadcast. The "find router" packet includes information indicating to any base stations 210, 211, 215 within receiving range of the broadcast that the particular mobile terminal 230 is seeking to register with a base station. The base stations which receive the packet, in turn, are programmed to transmit a "router identification" packet to any mobile terminals 230 from which they receive a "find router" packet. These "router identification" packets include information as to the identity of the base station, the amount of use (or "load") on the base station, and an indication of the relative location of the base station in the system 200. The information related to the location of the base station indicates to the mobile terminal how many "hops" the responding base station is from the system backbone 260. Base stations hardwired to the network are considered a single "hop" for the mobile terminal, whereas each additional wireless base station 215 used to access the network adds a "hop" through which the mobile terminal must communicate in order to access the backbone 260.

At step 430, the mobile terminal 230 waits for a preset period of time and determines whether a "router identification" signal has been received from at least one base station 210,211,215. If no "router identification" is received, then the mobile terminal 230 proceeds to step 440. At step 440, it is determined whether the particular embodiment of the mobile terminal 230 in use has the capability of communication at a slower rate. If it is possible, then at step 450 data transmission rate parameters within the mobile terminal 230 are changed to slow the data transmission rate, thereby increasing the signal range, and proceeds back to step 420 and attempts to register with a base station 210 at the slower transmission rate. If it is not possible to slow the communication rate, then the mobile terminal proceeds back to step 420 where it retransmits its "find router."

If, at step 430, the mobile terminal 230 receives a "router identification" signal, then the terminal proceeds to step 460. At step 460, the mobile terminal 230 determines if the responding base station 210 is acceptable. When all the responding base stations 210 are hardwired to the backbone 260 (i.e. a completely single "hop" network), then there are two instances when the responding base station 210 would be acceptable: (1) when the request to register signal was sent at the fastest rate, or (2) when the request to register was not sent at the fastest rate, however, there was no acceptance at an already attempted faster rate. If the mobile terminal 230 receives more then one acceptable "router identification" packet in step 460 then the mobile terminal 230 is programmed to evaluate the packets according to predetermine criteria in order to select a base station 210 with which to register. Such predetermined criteria may be based on, for example, which base station 210 exhibits the lowest load. The mobile terminal 230 will then proceed to step 480 where it will register with the base station 210 selected.

send information to the network via a given route. An example lookup table may be as follows:

Assume time for High speed = x, Medium speed = 2x, slow speed = 4x, and queuing time = .1x

|  | Wireless base station to network = High | Wireless base station to network = Medium | Wireless base station to network = Slow |
|---|---|---|---|
| Mobile to wireless base station = High | Time equals: x + x + .1x = 2.1x | Time equals: x + 2x + .1x = 3.1x | Time equals: x + 4x + .1x = 5.1x |
| Mobile to wireless base station = Med. | Time equals: 2x + x + .1x = 3.1x | Time equals: 2x + 2x + .1x = 4.1x | Time equals: 2x + 4x + .1x = 6.1x |
| Mobile to wireless base station = Slow | Time equals: 4x + x + .1x = 5.1x | Time equals: 4x + 2x + .1x = 6.1x | Time equals: 4x + 4x + .1x = 8.1x |

If the responding base station 210 is not acceptable, then the mobile terminal 230 will proceed to step 470 where the mobile terminal parameters are modified to send the "request to register" at a faster rate and then proceeds back to step 420 where it attempts to register at the faster rate. The purpose of the step 420 is to help optimize the system by ensuring that the base station with the strongest signal is being used.

In a multiple "hop" cellular communication system 200 having one or more wireless base stations responding to a mobile terminal's 230 "find router" packet, determining whether a given base station 210 is acceptable is slightly more complex. FIG. 4B depicts the steps taken by a mobile terminal when at least one wireless base station 215 responds to the mobile terminal's "find router" packet. As shown in FIG. 4B, steps 410B through 450B remain unchanged from corresponding steps 410 through 450 in the process described above dealing with the situation where all responding base stations are hardwired to the network. However, in this situation determining whether to register with a given base station, it is not enough that the mobile terminal is communicating at the fastest possible rate with any base station. What must be determined is at what speed the mobile terminal 230 must transmit information in order to register with a base station 210, 215 which will provide the fastest "overall" transmission time to the network. When wireless base stations 215 are involved, the overall time it takes a mobile terminal 230 to access the network will include the time it takes to send a packet from the mobile terminal 230 to the wireless base station 215, processing (or queuing) time for the wireless base station 215, and the time it takes the wireless base station to send the packet to the network. For instance, if a mobile terminal 230 is communicating with a wireless base station 215 at the fastest possible rate, a further inquiry must be made to determine what speed the wireless base station 215 is communicating with the network. If the wireless base station 215 is communicating at a slow speed with the network, it may be more optimal for the mobile terminal 230 to reduce its own communicating parameters and attempt to directly communicate with a base station 210 hardwired to the network. If this is done, the time it takes to send the information to the wireless base station 215 plus the processing time needed by the wireless base station is eliminated.

In order to account for these extra parameters associated with wireless base stations 215, lookup tables may be maintained within the memory of each mobile terminal 230. The lookup tables are set up to allow the mobile terminals 230 the ability to determine the overall time it would take to The values from this lookup table can be compared with the amount of time it would take if the mobile terminal 230 communicated directly with a hardwired base station 210, or the lookup table could be used to compare the total time it would take to communicate via two different wireless base station paths. In the preferred embodiment, the processor of the mobile terminal 230 would be programmed to optimize communication time given these calculations. As shown in FIG. 4B, in achieving these optimal settings, the mobile terminal at step 460B would initially determine if registering with one of the currently responding base stations would necessarily allow for an optimal setting. Such may be the case if the mobile terminal is transmitting at the fastest rate to a base station hardwired to the backbone. If the optimal setting is possible, then at step 500B registration is confirmed with this base station. If more then one responding base station would provide optimal settings, then one base station would be selected based on the mobile terminals predetermined criteria as discussed above.

If at step 460B, it is not possible to definitively select an optimal responding base station, then at step 470B the responding base station providing the best time is stored in memory. At step 480B, if the mobile terminal has sent out registration requests at all three speeds then the mobile terminal compares the best responding base station times from each of the three registration broadcasts. Following this comparison, the mobile terminal goes to step 500B where it selects the most optimal base station. If at step 480B, the mobile terminal has not sent out registrations at all three speeds then the transmission speed of the mobile terminal is adjusted to transmit at a faster rate if possible, or else at the slowest rate and the mobile terminal proceeds back to step 420. In this manner, the fastest path to the network is established by reviewing the overall transmission time to the network at different rates.

Each wireless base station 210 transmits registration information to base stations with which it formed a permanent link, as is discussed above. Registration update packets are sent out periodically by each wireless base station to each base station 210 forming a link to the system backbone 260. Upon receiving the registration update packet, each base station adds the mobile terminals indicated in the update packet into their own registration table. In this manner, base stations hardwired to the network will know which packets to copy off of the system backbone 260 and transmit to the mobile terminal via the permanent link formed with the wireless base station(s).

Whenever information packets are wirelessly transmitted, there is a real possibility of errors occurring within the packet. In situations where wireless base stations are used as intermediate links between the network and a mobile terminal, the possibility of errors occurring significantly increases since the information is being wirelessly transmitted and received multiple times depending on the number of wireless base stations involved. Therefore, under the present invention, each wireless base station has an error correction circuit 378 (FIG. 3C) which is used to correct errors in the information packet received prior to retransmitting the packet. In this manner, stacked errors which occur from the repeated wireless transmission of data is better avoided.

Figure 5:
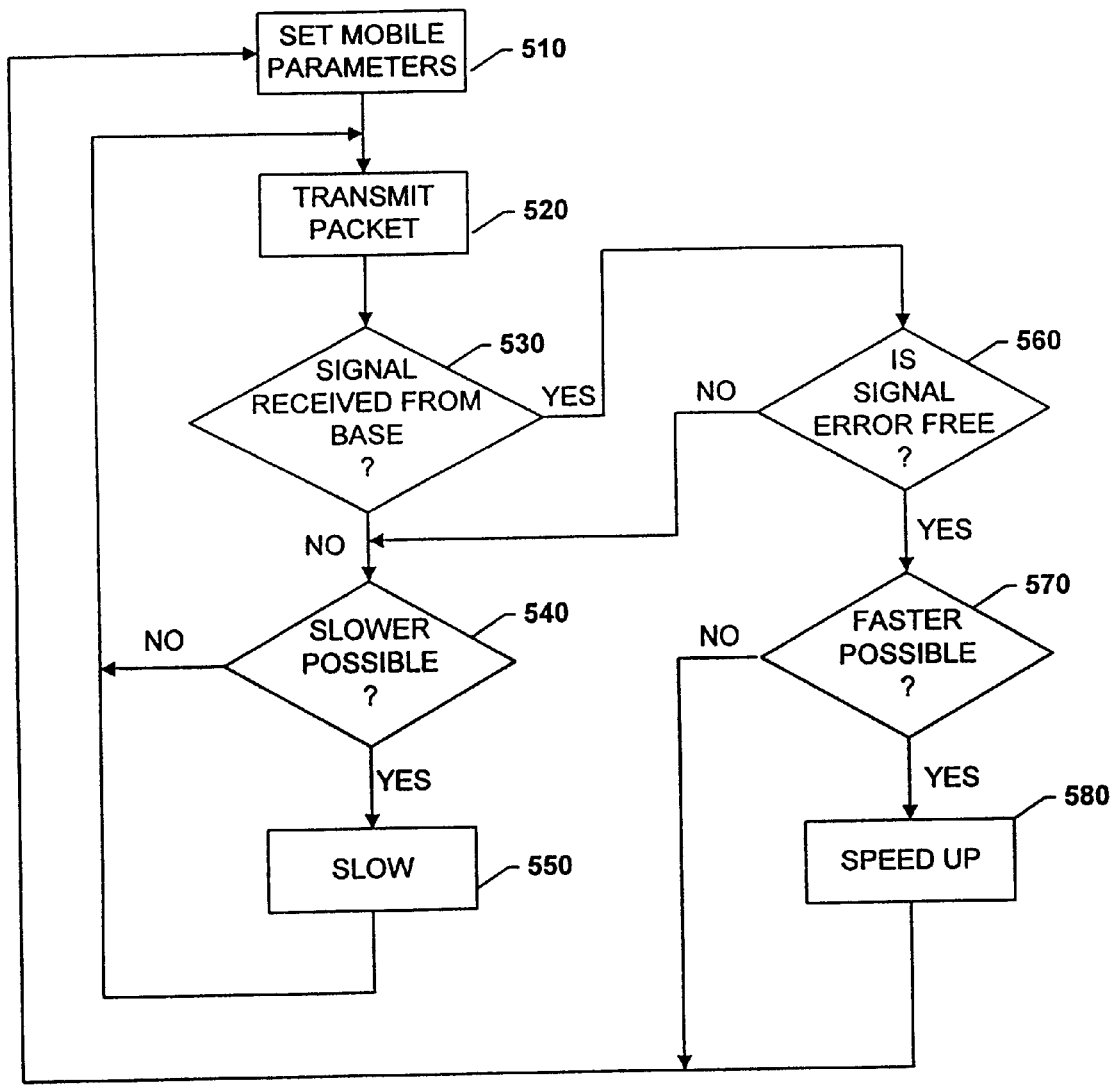
FIG. 5 is a system flowchart illustrating a mobile terminal setting communication parameters to correspond to a selected data communications rate with a base station.

Once the mobile terminal 230 is registered and an initial data rate is set, all communication between the base stations 210, 215 and the mobile terminal 230 may take place at that data rate. Periodically, the mobile terminal 230 may attempt to re-register at a faster data rate. Alternatively, the mobile terminal may vary the communication rate while already registered. FIG. 5 is a flowchart which represents this process. Step 510 represents the mobile terminal setting the communication parameters to correspond to the data rate at which it will attempt communication with the base station 210, 215. The initial setting may be a default rate, a rate previously used, a rate at which the mobile terminal 230 has recently intercepted a transmission from the base station, or a rate set by some other criteria. At step 520, the mobile terminal 230 transmits a "find router" packet at the rate set. At step 530, the mobile terminal 230 then waits to receive a "router identification" response signal from the base station 210. The base station 210 will send the response signal at the same data rate or rates used by the mobile terminal 230. If no response signal is received by the mobile terminal 230, it can be concluded that the base station 210, 215 did not receive the transmission, or the transmission was not received error free. Therefore the mobile terminal 230 attempts to increase the range and accuracy by using a slower data rate. Step 540 represents the mobile terminal determining whether a slower rate is possible. If the determination results in a positive answer, the mobile terminal 230 varies communication parameters to slow the rate at step 550 and retransmits at step 520. If a slower rate is not possible, the mobile terminal 230 simply returns to step 520 to attempt another transmission. To avoid an endless loop at the slowest data rate, the mobile terminal 230 may attempt to register with another base station (as discussed earlier) when communication is no longer possible with the present base station 210 or 215.

If, at step 530, a response signal is received within a preset period of time, then the mobile terminal 230 proceeds to step 560. At step 560, the mobile terminal 230 determines whether the response signal was received error free. If not, then the mobile terminal progresses to step 540 where it determines if a slower data rate is possible. However, if the response signal is received error free, then the mobile terminal proceeds to step 570 where it determines whether a faster communication rate with the base station 210 or 215 is possible. If it is possible, then at step 580 one or more communication parameters within the mobile terminal 230 are changed to increase the communication rate with the base station. The new parameters are set at step 510 for use when transmitting the next packet. If, however, at step 570, it is not possible to increase the communication rate between the mobile terminal and the base station, then the mobile terminal will simply keep the currently set communication parameters at step 510.

Figure 6A:
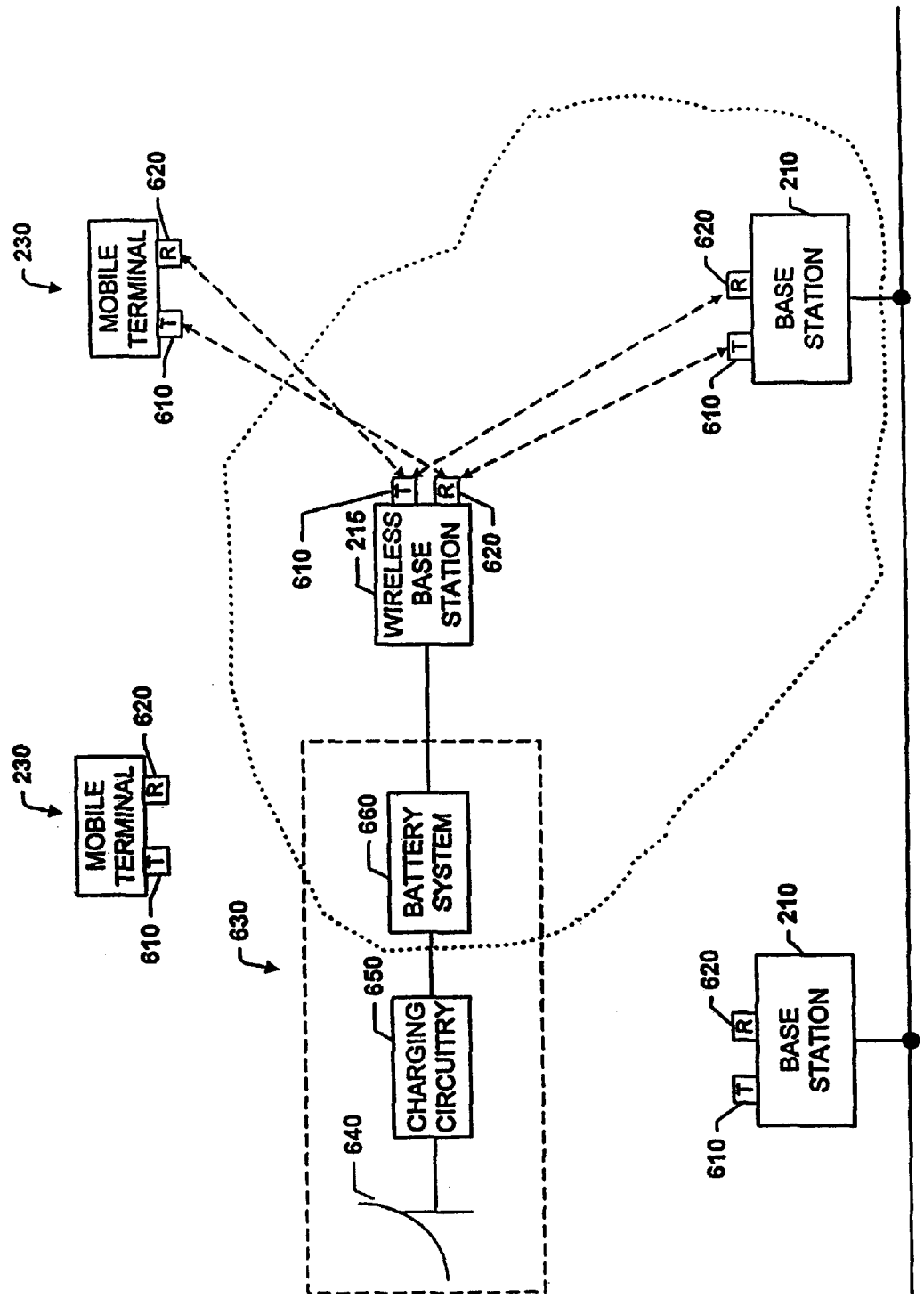
FIG. 6A is a schematic representation of a portion of a cellular communication system of the present invention.

As an illustrative example of a cellular communication system in accordance with this invention, FIG. 6A shows a mobile terminal 230 communicating with a device on the system backbone 260. The mobile terminal is registered to a wireless base station 215 which has formed a permanent link to the system backbone through base station 210. Both the wireless base station 215 and the hardwired base station 210 have the ability to dynamically alter parameters such as modulation complexity, PN code length, and/or chipping rate in order to optimize data transmission as discussed above. The wireless base station 215 increases the geographic area in which the mobile terminal 230 can travel and still maintain contact with devices on the system backbone 260. In order to further increase the distance from which the wireless base station 215 can communicate with the base station 210, an omnidirectional type antenna is directed toward the base station 210. In other embodiments, the two antennas could be attached to the wireless base station, wherein one antenna is a yagi type directed antenna for communicating with the hardwired base station, and a second antenna is a omnidirectional type antenna for receiving and transmitting to the mobile terminal 230. Although only one wireless base station 210 is shown to act as an intermediate link between the mobile terminal 230 and the base station 210, it should be appreciated that several wireless base stations 210 could be used in a row to further extend communicating range.

As described above in the background section, oftentimes there are problems associated with running power lines from the system backbone 260 to the wireless base station 215. To avoid these problems, this invention utilizes a solar powering system 630 to provide power to the wireless base station 215. In other embodiments, wind, water or other natural energy resources could be used. Referring to FIG. 6A, the solar powering system 630 includes solar panels 640, charging circuitry 650, and a battery system 660. The charging circuitry 650 is coupled to the solar panels 640 and the battery system 660 and serves to regulate the amount of power fed into the battery system 660 at any given time. The battery system 660 is coupled to the wireless base station 215 and provides power independent of any power supplied through the system backbone 260. It should be appreciated that in another embodiment the wireless base station 215 may connect directly to the charging circuitry 650 or the solar panel 640 itself.

Figure 6B:
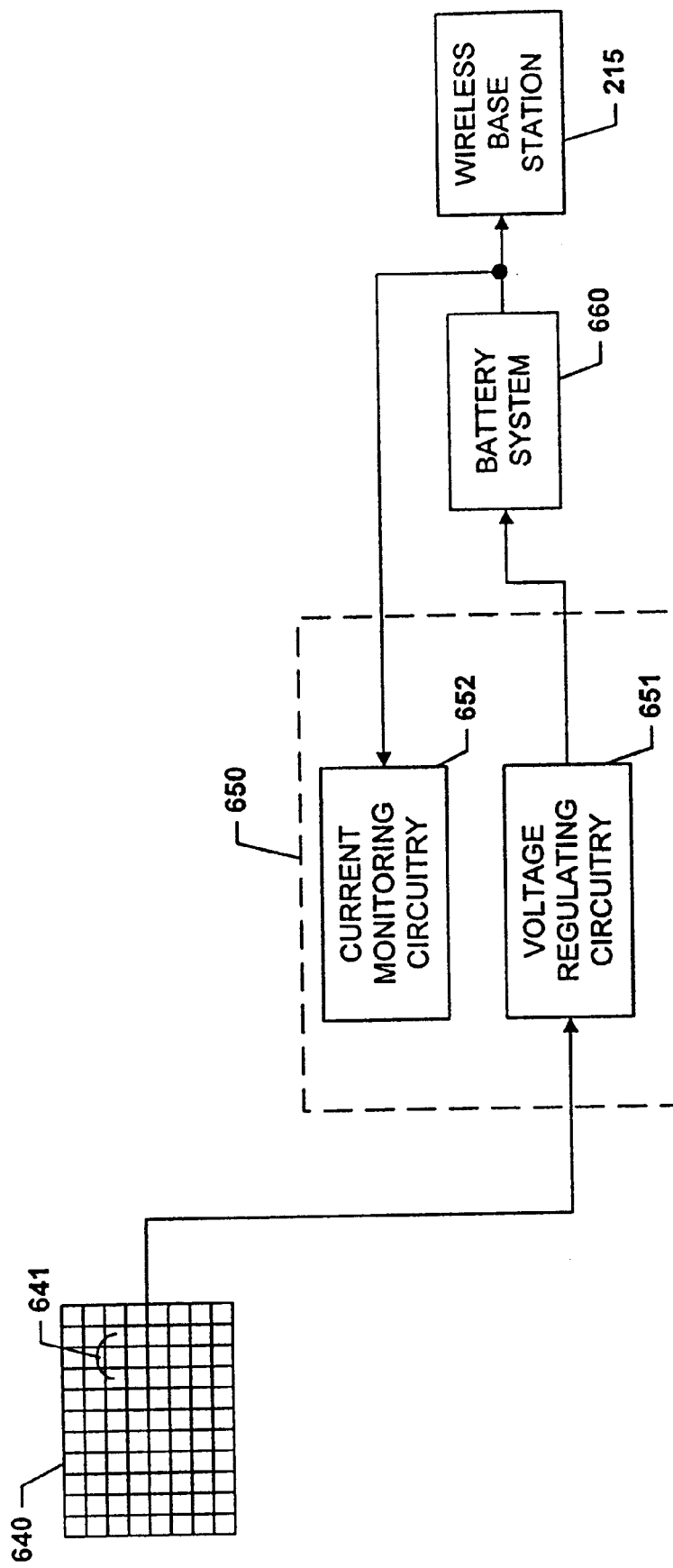
FIG. 6B is a block diagram of a solar powered wireless base station in accordance with the present invention.

In this particular embodiment, a photovoltaic solar panel 640 having a number of cells 641 is used as shown in FIG. 6B. The cells 641 are textured and have an anti-reflection coating in order to better absorb energy from the sun. The overall size of the solar panel 640 is approximately five square feet. The solar panel 640 should be of a type which can sufficiently recharge the battery system 660 within a reasonable amount of time determined by the estimated amount of sun light expected in a given area. For example, in particularly sunny areas such as a desert it may be sufficient to have smaller or fewer solar panels 640 which recharge the battery system 660 at a slower rate since it is expected that the sun's energy can be captured by solar panels 640 during a large part of the day. By contrast, in areas where it may be cloudy during a greater portion of the day, larger solar panels 640 capable of recharging the battery system 660 in a shorter period of time may be necessary in order to ensure the solar powering system 630 remains reliable throughout various weather conditions. In many typical climates having semi-unpredictable weather conditions, a solar panel 640 such as the model M55 produced by Siemens of Camarillo, Calif. may be used. It is estimated that this particular solar panel is capable of fully recharging the battery system 660, described in more below, after receiving approximately twenty four hours of full sun light. It should be appreciated, however, that full sun light is not necessary to recharge the battery system as the solar panels can still capture solar energy at a slower rates when conditions do not allow for full sun light to be received.

The purpose of the battery system 660 is to store energy captured by the solar panels 640 for later use. In this particular embodiment, two 12-volt lead acid gel cell batteries connected in series are used to form the battery system 660. Each battery is rated to provide 90 amp-hours of power. At this rate, it is estimated that at full charge the battery system containing these two batteries could supply approximately nine days of continuous power to the wireless base station 215 without any recharging. A variety other batteries capable of supplying varying amounts of power could readily be used.

The charging circuitry 650 regulates the amount of energy fed into the battery system 660 and monitors the power level of the battery system 660. In order to perform these functions, the charging circuitry 650 includes voltage regulating circuitry 651 and current monitoring circuitry 652. The voltage regulating circuitry 651 connects the solar panels to the battery system 660 and provides constant voltage to the battery system 660 during recharging. The monitoring circuitry 652 regulates when recharging is to occur and is therefore connected to the voltage regulating circuitry 651. The monitoring circuitry is further connected to the output of the battery system 660 in order to monitor the amount of power being drained by the wireless base station 215. The monitoring circuitry 652 is set to allow solar based energy to enter the battery system 660 for recharging when the monitoring circuitry 650 senses the battery system 660 has dropped below a charge resumption set point. In this particular embodiment, the charge resumption set point is set at 18 volts which represents a lower end voltage level at which the wireless base station can still operate properly. Charging circuitry 650 such as the Automatic Sequencing Charger (ASC) produced by Specialty Concepts, Inc of Canoga Park, Calif. could be used in this invention.

The amount of power consumed by a typical wireless base station 215 will greatly vary by the amount of activity being processed. It is estimated that the amount of power needed to run an wireless base station in its idle state is 0.25 amps at 22 volts. During an active state, such as when the wireless base station is transmitting or receiving information, approximately 0.5 amps is needed at the same voltage level. In any event, by utilizing the solar powering system 630, the power requirements for the wireless base station 215 of this exemplary embodiment will be met.

Generally, as described above, the transmitter system 610 and the receiver system 620 of the base stations 210, wireless base station 215 and mobile terminal 230 will adjust their parameters in order to optimize the system 200. Thus, the following sections describe in detail a variety of embodiments which the transmitter system 610 and receiver system 620 may use in adjusting these data rates.

FIGS. 3B and 3C, discussed above, illustrate only one example of embodiments of a mobile terminal 230 and a base station 210,215 in accordance with the invention. There are, in fact, a variety of ways in which similar flexibility in the data transmission characteristics can be obtained. The following is a discussion which generally describes different embodiments of a transmitter system and a receiver system for use in the mobile terminals and base stations.

The transmitter system, generally designated 610, of the present invention may be implemented in a number of embodiments. For example, referring to FIGS. 7A, 7B, and 7C, these embodiments may include two or more non-controllable transmitters 710*a*, a controllable transmitter 710*b*, and a combination of a non-controllable transmitter 710*a* and a controllable transmitter 710*a*. A non-controllable transmitter 710*a*, as shown in FIG. 7D for example and described in further detail below, is a transmitter which is typically used in conventional base stations 211 and conventional mobile terminals 231 because it is capable of transmitting PN coded signals formed with PN codes having only one preselected, non-adjustable value of each characteristic. On the other hand, a controllable transmitter 710*b*, as shown in FIG. 7E and described in more detail below, is a transmitter capable of transmitting PN coded signals formed with PN codes having a plurality of adjustable values for one or more modulation characteristics.

Figure 7A:
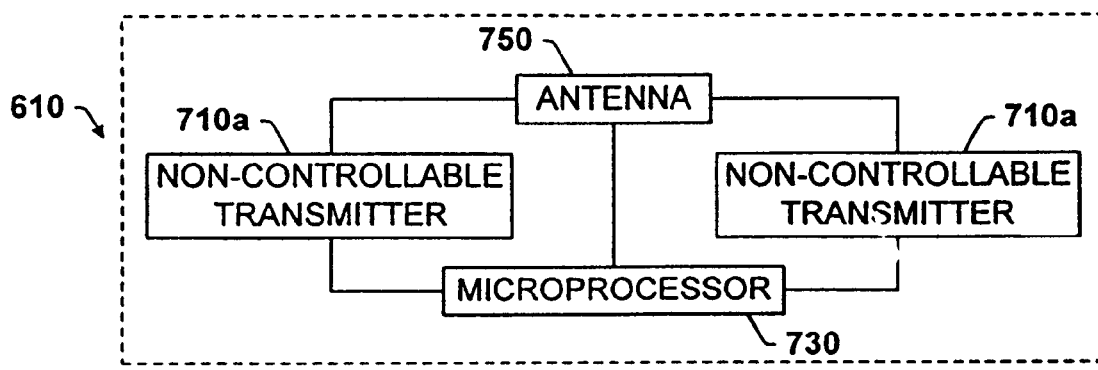
FIG. 7A is a block diagram of one embodiment of a transmitter system of the present invention.

FIG. 7A illustrates one of the embodiments of the transmitter system 610. For this embodiment, the transmitter system 610 includes a plurality of non-controllable transmitters 710*a*, a microprocessor 730 and an antenna 750. Each non-controllable transmitter 710*a* is capable of transmitting at a packet rate that is different than the values selected for each of the other non-controllable transmitters 710*a*. As is discussed above, the header portion 310 and the data portion 320 of the packet 300 may be sent at different data transmission rates and, therefore, each packet rate represents a different combination of these possibilities. Once a packet rate has been determined (via the processes described with reference to FIGS. 4 and 5), a microprocessor 730 will prepare for transmission by selecting the non-controllable transmitter 710*a* capable of transmitting at this rate.

Figure 7B:
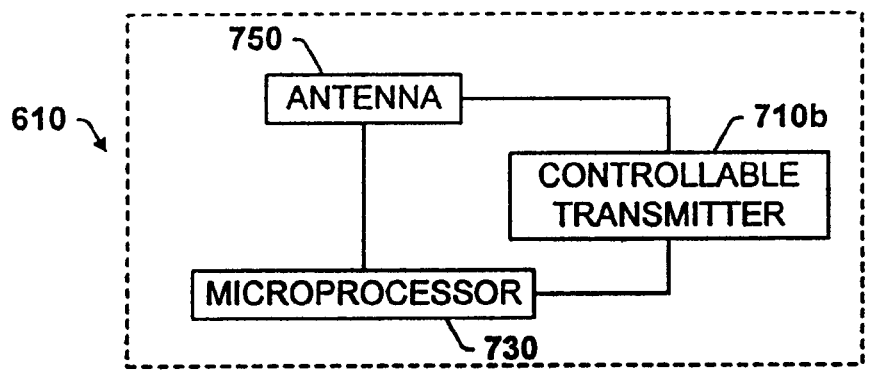
FIG. 7B is a block diagram of another embodiment of a transmitter system of the present invention.

FIG. 7B illustrates another embodiment of the transmitter system 610. This embodiment is very similar to the transmitter system 610 shown in FIG. 7A. However, this transmitter system 610 includes a controllable transmitter 710*b*, as opposed to a plurality of non-controllable transmitters 710*a*. Thus, in preparing for transmission, the microprocessor 730 will make adjustments to the controllable transmitter 710*b* such that it is capable of transmitting at the given packet rate.

Figure 7C:
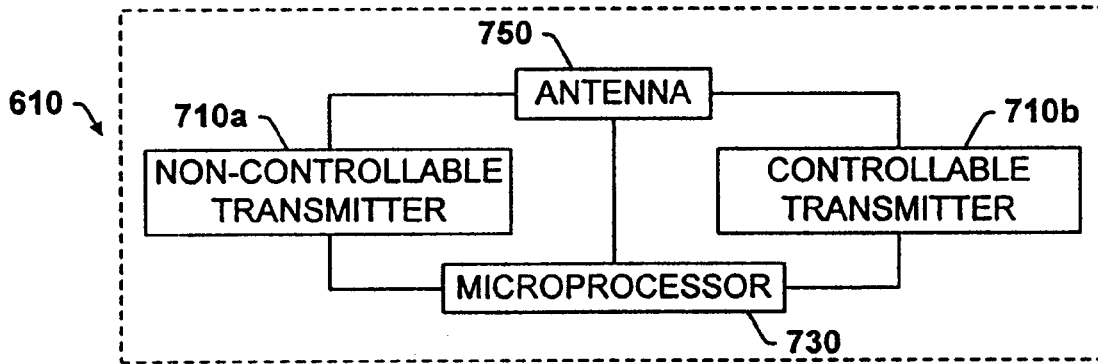
FIG. 7C is a block diagram of another embodiment of a transmitter system of the present invention.
Figure 7D:
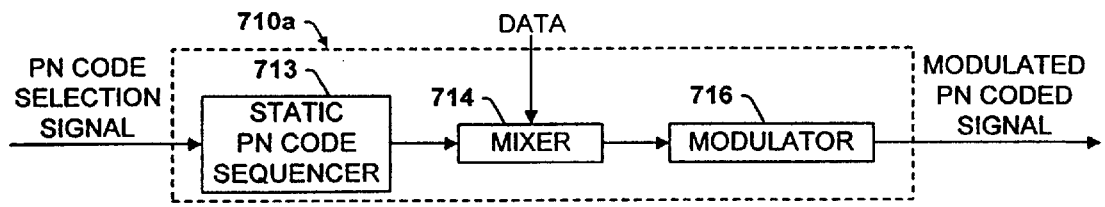
FIG. 7D is a block diagram of a non-controllable transmitter of the present invention.
Figure 7E:
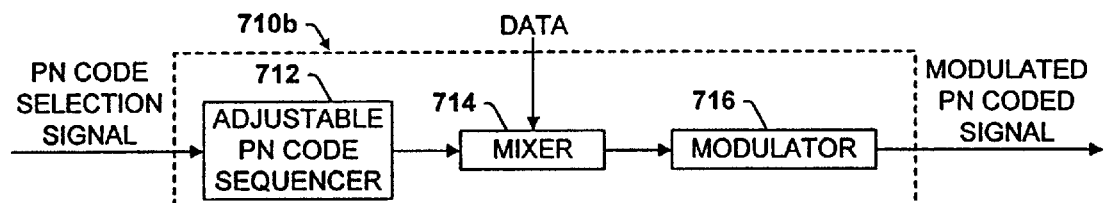
FIG. 7E is a block diagram of a controllable transmitter of the present invention.

FIG. 7C illustrates yet another embodiment of the transmitter system 610. This embodiment is also very similar to the transmitter systems 610 illustrated above in FIGS. 7A and 7B. However, this transmitter system 610 includes a non-controllable transmitter 710*a* and a controllable transmitter 710*b*. In preparing for transmission, the microprocessor 730 will first look to see if any non-controllable transmitter 710*a* is capable of sending at the given packet rate and, if so, the microprocessor 730 selects this transmitter. However, if no such non-controllable transmitter exists, then the microprocessor 730 will adjust the controllable transmitter 710*b* to send at the given packet rate.

Following the selection or adjustment of the proper transmitter in any of the embodiments shown above (7A, 7B, 7C), the microprocessor 730 may also adjust other communication parameters (i.e. antenna type, signal power, etc.) prior to transmission. Once all of these additional characteristics are adjusted for, the transmitter selected prepares to transmit according to the parameters set.

FIGS. 7D and 7E, are block diagrams of the non-controllable transmitter 710*a* and the controllable transmitter 710*b*. Referring to FIG. 7D, the non-controllable transmitter 710*a* generally includes a static PN code sequencer 713, a mixer 714 and a modulator 716. The mixer 714 receives the data to be transmitted and mixes the data with a PN code received from the static PN code sequencer 713, which is a PN code sequencer capable of sequencing a PN code having only constant parameters (i.e. chip code length, chipping rate . . . etc.). The mixer 714 then mixes the data with the PN code to form the PN coded signal and forwards the PN coded signal to the modulator 716. The modulator 716 then modulates the PN coded signal onto a carrier frequency with, for example, a BPSK or QPSK modulation complexity type.

Referring to FIG. 7E, the controllable transmitter 710b generally includes an adjustable PN code sequencer 712, a mixer 714 and a modulator 716. In operation, the adjustable PN code sequencer 712, which is a PN code sequencer capable of adjusting a PN code to a variety of parameters, receives a signal from the microprocessor 730 indicating the parameters to be set. This signal is then used to adjust the PN code values of the PN code sequencer 712 accordingly. The PN code sequencer 712 then forwards to the mixer 714 a PN code having the parameters selected. The mixer 714 receives data to be transmitted and mixes the data with the PN code received from the adjustable PN code sequencer 712. The mixer 714 then mixes the data with the PN code to form the PN coded signal and forwards the PN coded signal to the modulator 716. The modulator 716 then modulates the PN coded signal onto a carrier frequency with one of the modulation complexities.

Associated with each transmitter system 610 is a receiver system 620 using the same antenna 750 and microprocessor 730. However, unlike the transmitter systems, a receiver system is required to maintain certain characteristics when housed in a base station 210 which are not necessary for receiver systems housed in mobile terminals. The reason for the difference is that base station receivers, under this embodiment, are initially required to handle packets being sent at either the mid or slow packet rates (i.e. BPSK modulation and either an 11 or 22 chip PN code length, see above). Thus, in order to handle either instance, the base station receiver system must have at least two correlators to account for the different chip code lengths. A mobile terminal 230, on the other hand, initiates the communication with a base station 210 at a specific rate and any responding base station must reply at the same rate. Therefore, the mobile terminal receiver will not have to "guess" as to which rate the base station will respond and only needs one correlator to effectively communicate.

Similar to the transmitter system 610, the receiver system 620 of the present invention may also be implemented in a multitude of embodiments with the only restriction being that receiver systems for base stations must have at least two separate correlators, one of which is capable of handling a slow packet data transmission rate and one of which is capable of handling a mid packet data transmission rate. As described below, each receiver typically has only one correlator associated with it and, therefore, the receiver system 620 must have at least two receivers within it. However, since the initial packet is always sent at the BPSK rate (i.e. mid or slow rates) only one demodulator is needed to handle this initial data. If it is indicated that further data will be sent at the fast packet rate, then a second demodulator capable of handling a QPSK modulation complexity would be necessary.

Figure 8A:
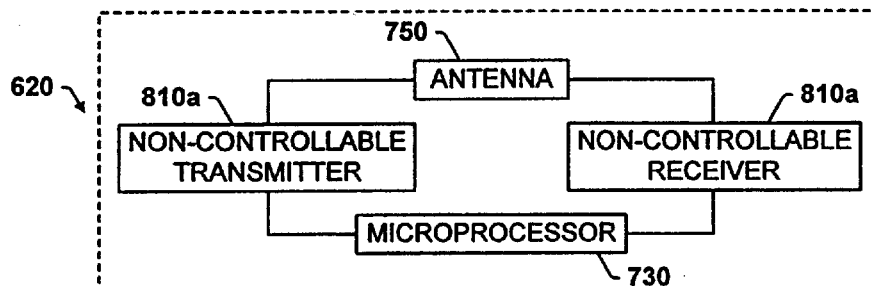
FIG. 8A is a block diagram of one embodiment of a receiver system of the present invention suitable for use within a base station or a mobile terminal.
Figure 8B:
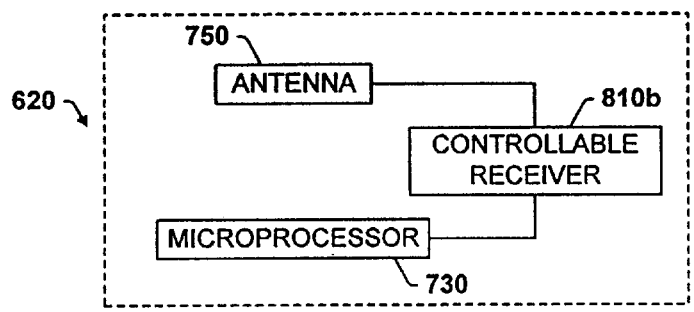
FIG. 8B is a block diagram of another embodiment of a receiver system of the present invention suitable for use within a base station or a mobile terminal.

FIGS. 8A and 8B show typical embodiments of the receiver system 620 of the present invention which may be used within a base station 210 or a mobile terminal 230. For instance, FIG. 8A shows the receiver system 620 with a combination of two or more non-controllable receivers 810a, while FIG. 8B shows the receiver system 620 having a combination of a controllable receiver 810b and a non-controllable receiver 810a. As describe below, non-controllable receivers 810a are ones which do not have the capability of changing their own parameters to receive packets at data communication rates other then the rate preset within the particular non-controllable receiver. The controllable receivers 810b, on the other hand, have at least some capability to vary their receiving parameters to be able to receive packets at more then one data communication rate.

In operation, when only non-controllable receivers 810a are used in the receiver system 620 (see FIG. 8A), the microprocessor 730 will simply select the non-controllable receiver 810a capable of handling the packet to be received. If no such non-controllable receiver 810a exists, then the receiver system 620 would not be capable of receiving this packet. If, however, both a non-controllable receiver 810a and a controllable receiver 810b exist in the same receiver system 620 (see FIG. 8B), then the microprocessor 730 first determines whether the non-controllable receiver 810a is capable of handling the packet to be received. If so, the microprocessor 730 selects this non-controllable receiver 810a. If the non-controllable receiver 810a is not capable of handling the packet, then the microprocessor 730 will simply adjust the controllable receiver 810b such that it is capable of receiving the anticipated packet. Following this selection/adjustment process, the microprocessor 730 may also make adjustments to other parameters which may help the receiving process (ie., changes to the antenna, battery power, etc.).

Figure 8C:
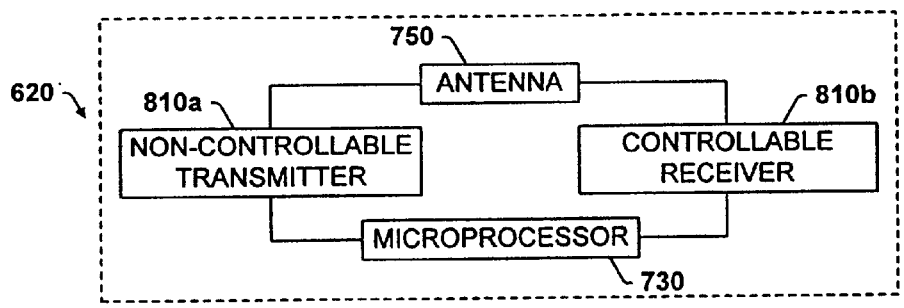
FIG. 8C is a block diagram of another embodiment of a receiver system of the present invention suitable for use within a mobile terminal with one controllable receiver.

As indicated above, since the mobile terminal 230 does not require two correlators, it is possible that only one receiver is used within the mobile terminal. Therefore, FIG. 8C depicts another embodiment which is available for the mobile terminal only. In this embodiment, the receiver system 620 utilizes only one controllable receiver 810b which is continually adjusted by the microprocessor 130 to receive packets at the desired rate.

Figure 8D:
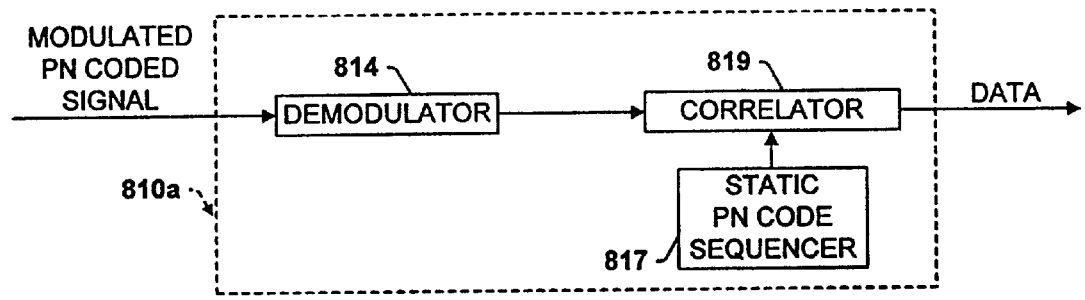
FIG. 8D is a block diagram of a non-controllable receiver of the present invention.
Figure 8E:
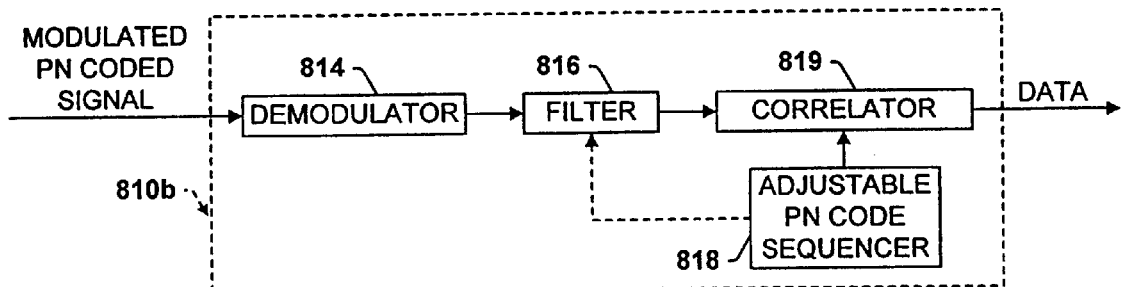
FIG. 8E is a block diagram of a controllable receiver of the present invention.

FIGS. 8D and 8E further describe the non-controllable receiver 810a and the controllable receiver 810b, respectively. Referring to FIG. 8D, the non-controllable receiver 810a generally includes a demodulator 814, a static PN code sequencer 817 and a correlator 819. In operation, the particular non-controllable receiver 810a has been selected by the microprocessor 730 because of its capability of receiving a packet having certain values which correspond to those values transmitted from a transmitter system 610.

The demodulator 814 receives the modulated PN coded signal from the transmitter system 610. The demodulator 814 demodulates the PN coded signal from the carrier frequency and forwards the PN coded signal to the correlator 819. The correlator 819 also receives a PN code received from the static PN code sequencer 817, which is a PN code sequencer capable of sequencing a PN code having only constant values. The correlator 819 then uses the PN code to correlate the data (extract or decode the data) from the PN coded signal.

Referring to FIG. 8E, as described above, the receiver system 620 may also include a controllable receiver 810b which may be used instead of or in conjunction with the non-controllable receivers 810a. The controllable receiver 810b is similar to the non-controllable receiver 810a but is additionally capable of receiving PN coded signals formed with PN codes having different values.

The controllable receiver 810b includes a demodulator 814, a filter (preferably a baseband filter) 816, an adjustable PN code sequencer 818 and a correlator 819. In operation, the demodulator 814 receives the modulated PN coded signal from the transmitter system 610. The demodulator 814 demodulates the PN coded signal from the carrier frequency and forwards the PN coded signal to the filter 816. Prior to receiving the PN coded signal, the filter 816 receives the PN code chipping rate value signal from the microprocessor 730 and adjusts its spectral bandwidth based on the PN code chipping rate value received. Upon receipt of the PN coded signal, the filter 816 then filters the PN coded signal and forwards the filtered PN coded signal to the correlator 819. Additionally, the adjustable PN code sequencer 818 may also be feed through the filter 816 prior to entering the correlator 819.

Prior to receiving the filtered PN coded signal, the correlator 819 receives a PN code length signal form the microprocessor 730 and adjusts itself accordingly to correlate a PN code having the PN chip code length value. In another embodiment, the correlator 819 is actually a plurality of correlators 819 and the microprocessor 730 selects the correlator 819 capable of correlating a PN code having the selected PN code length value.

Upon receipt of the PN coded signal, the correlator 819 also receives a PN code from the adjustable PN code sequencer 818, which is a PN code sequencer capable of adjusting a PN code to a variety of values received form the microprocessor 730. The correlator 819 then uses the PN code to correlate (decode) the data from the PN coded signal.

Another embodiment of the cellular communication system 200 of the present invention includes a mobile terminal 230 and/or base station 210 that can vary its transmitting parameters but not its receiving parameters. Conversely, such a system 200 may have a mobile terminal 230 and/or a base station 210 that can vary only its receiving parameters but not its transmitting parameters.

Figure 9:
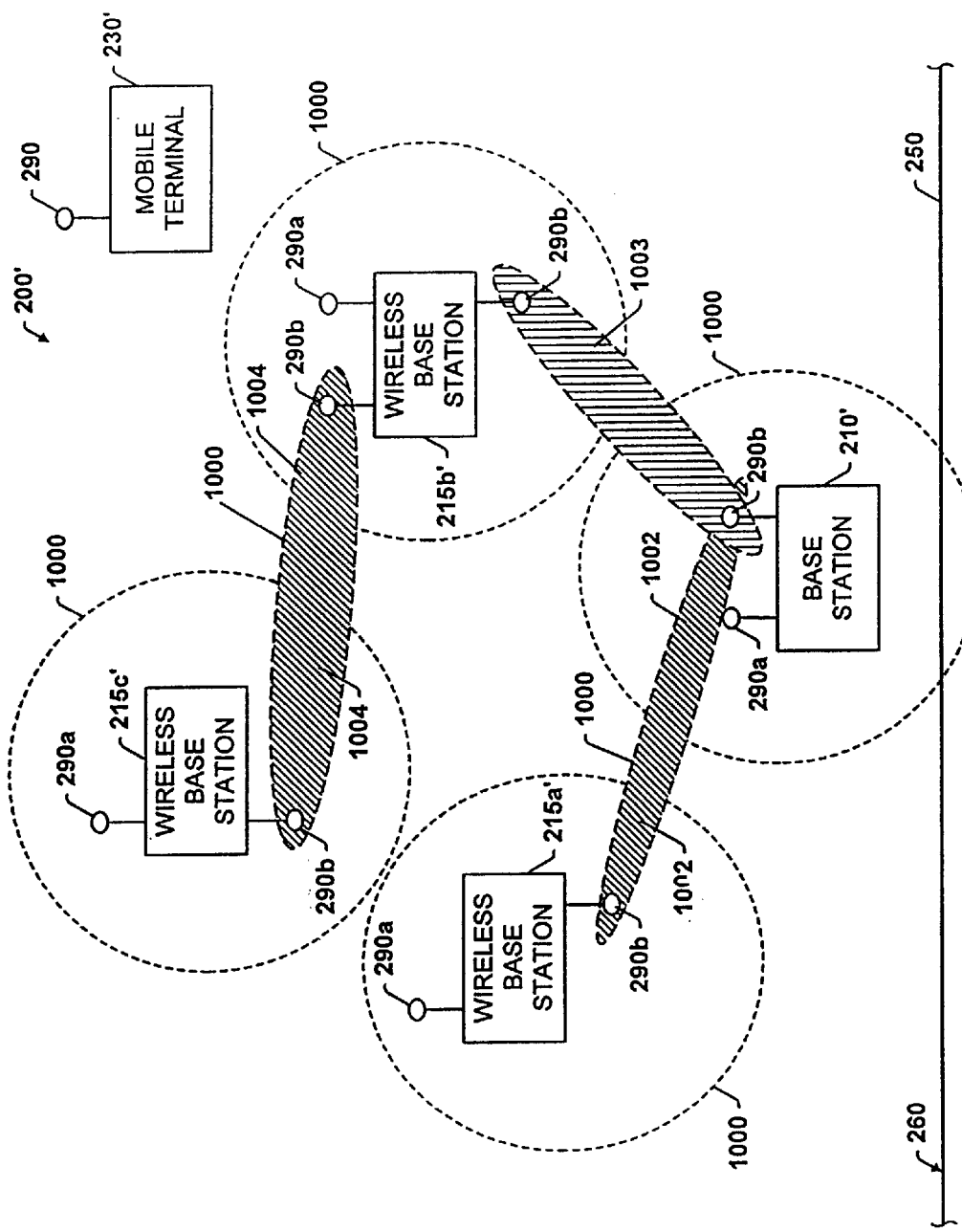
FIG. 9 is a schematic representation of a cellular communication system of the present invention with an emphasis on the overlapping of cell areas between base stations and wireless base stations.

Referring now to FIG. 9, the present invention provides for an alternative embodiment whereby dedicated repeater controller transceivers are used to handle all communications between wireless base stations and base stations. In this embodiment, the cellular communication system is denoted by the reference label 200'. The system 200' includes a system backbone 260 such as that discussed above in relation to FIG. 2. The system 200' further includes one or more mobile terminals 230' which are configured to transmit and receive communications on a given communication channel. In this embodiment, the mobile terminals 230' may be conventional or may include dynamically modifiable transmission parameters as discussed above in relation to FIG. 3B.

The system 200' also includes one or more wireless base stations 215', and base stations 210' which are hardwired to the system backbone 260. The base stations 210' and 215' each preferably include a base station transceiver for communicating directly with the mobile terminals on the mobile terminal communication channel. In addition, however, the base stations include one or more repeater controller transceivers for carrying out communications between the base stations themselves on a channel other than that used by the mobile terminals. As is discussed below in relation to FIGS. 10–14, the base station transceiver and repeater controller transceiver can be essentially separate transceivers. Alternatively, as discussed below in relation to FIG. 15, the base station and repeater controller transceivers may be made up of the same transceiver hardware having modifiable transmission parameters as discussed above. Such modifiable transmission parameters in such case can be used to operate on what are also referred to herein as different channels. Consequently, it is possible for the same transceiver to operate on two or more different channels. One set of transmission parameters is used to communicate with the mobile terminals via one channel and another set of transmission parameters is used to communicate with other base stations via another channel.

In the exemplary topology shown in FIG. 9, a base station 210' is hardwired to the system backbone 260 via the hardwired network bus 250. Included in the system 200' are wireless base stations 215a' thru 215c', which serve as intermediary stations for extending the effective cell coverage of the base station 210'. For example, a mobile terminal may be registered to wireless base station 215c' which is effectively daisy chained to the base station 210' via wireless base station 215a'. Such a mobile terminal would transmit information directly to the wireless base station 215c', which would process the information and then transmit the information to wireless base station 215a'. In turn, the wireless base station 215b' would process the information and transmit it to the base station 210'. Thus, a communication from the mobile terminal registered to wireless base station 215c' would involve one direct communication between a mobile terminal and a base station, and two subsequent communications from one base station to another. In a conventional system in which communications between mobile terminals and base stations are carried out on the same channel as are communications between base stations, such a multistep communication is likely to encounter/cause numerous contentions for the same channel with nearby mobile terminals and base stations as will be appreciated.

Each of the base stations includes an antenna 290a for transmitting and receiving packets via RF signals as discussed above. The cell area for each of the base stations in the exemplary embodiment is defined by a dashed line 1000 surrounding the respective base stations and corresponds to the area in which the base stations may conduct direct communication with a registered mobile terminal. Directional antennas 290b are also shown connected to each base station 210, 215 to create a more directed communication link between each wireless base station 215 and the backbone 260. Thus, the cell areas 1000 associated with each directional antenna 290b is more oblong in shape. As mentioned above, the cell areas 1000 relate to those regions in which the base stations can reliably transmit and receive signals. As is noted in FIG. 9, there are regions 1002–1004 where the cell areas of the base stations overlap each other. For example, the cell areas of base station 210' and wireless base station 215a' overlap at regions 1002. The cell areas of base station 210' and wireless base station 215b' overlap at region 1003, and the cell areas of wireless base station 215b' and wireless base station 215c' overlap at regions 1004. Due to the overlapping nature of the cell areas, it is possible for the wireless base stations 215' to serve as intermediary stations for effectively extending the coverage of the base station 210' as will be appreciated.

In a conventional cellular communication system, the overlap regions 1002–1004 would present problems in those instances where the mobile terminal 230' included in the system 200' roams into one of the overlap regions as discussed above. Namely, transmission from mobile terminals within the regions would cause the wireless base stations and hardwired base stations to perform a random backoff. In the present invention, however, the mobile terminal 230' communicates with the base station to which it is registered on a given mobile terminal communication channel. The base stations 210' and 215', in the meantime, communicate amongst each other on a channel different from the channel utilized by the mobile terminals. Hence, suppose the mobile terminal 230' is located in the overlap region 1002 between the base station 210' and the wireless base station 215a', and is currently registered to the wireless base station 215a' according to any conventional predetermined protocol. If the mobile terminal 230' begins transmitting information to the wireless base station 215a' on the given channel, the wireless base station 215a' will receive the transmission on the given channel. However, the wireless base station 215a' is not precluded from communicating with other base stations (e.g., base station 210') at the same time because such communications are designed to occur on a different channel. As a result, there is a significant decrease in unnecessary delays created in contention areas which may reduce system performance.

Alternatively, suppose the mobile terminal 230' is in the overlap region 1004 and is registered with the wireless base station 215c'. The mobile terminal 230' may wish to transmit information to the wireless base station 215c' at a time when the wireless base station 215b' is transmitting information received from another mobile terminal (not shown) to the base station 210' using the same channel. In a conventional system using CSMA, the mobile terminal 230' would detect signal traffic from the wireless base station 215b' and perform a random backoff prior to attempting to transmit information to the wireless base station 215c'. In the present invention, however, the communication between the wireless base station 215b' and the base station 210' is on a channel which is different from the channel to be used by the mobile terminal 230' to transmit the information. As a result, the mobile terminal 230' is able to transmit the information immediately and not experience an unnecessary delay. It will be appreciated that other scenarios can arise involving the overlapping regions whereby the present invention avoids conflicts by using a separate channel dedicated to the communications among the base stations.

Figure 10:
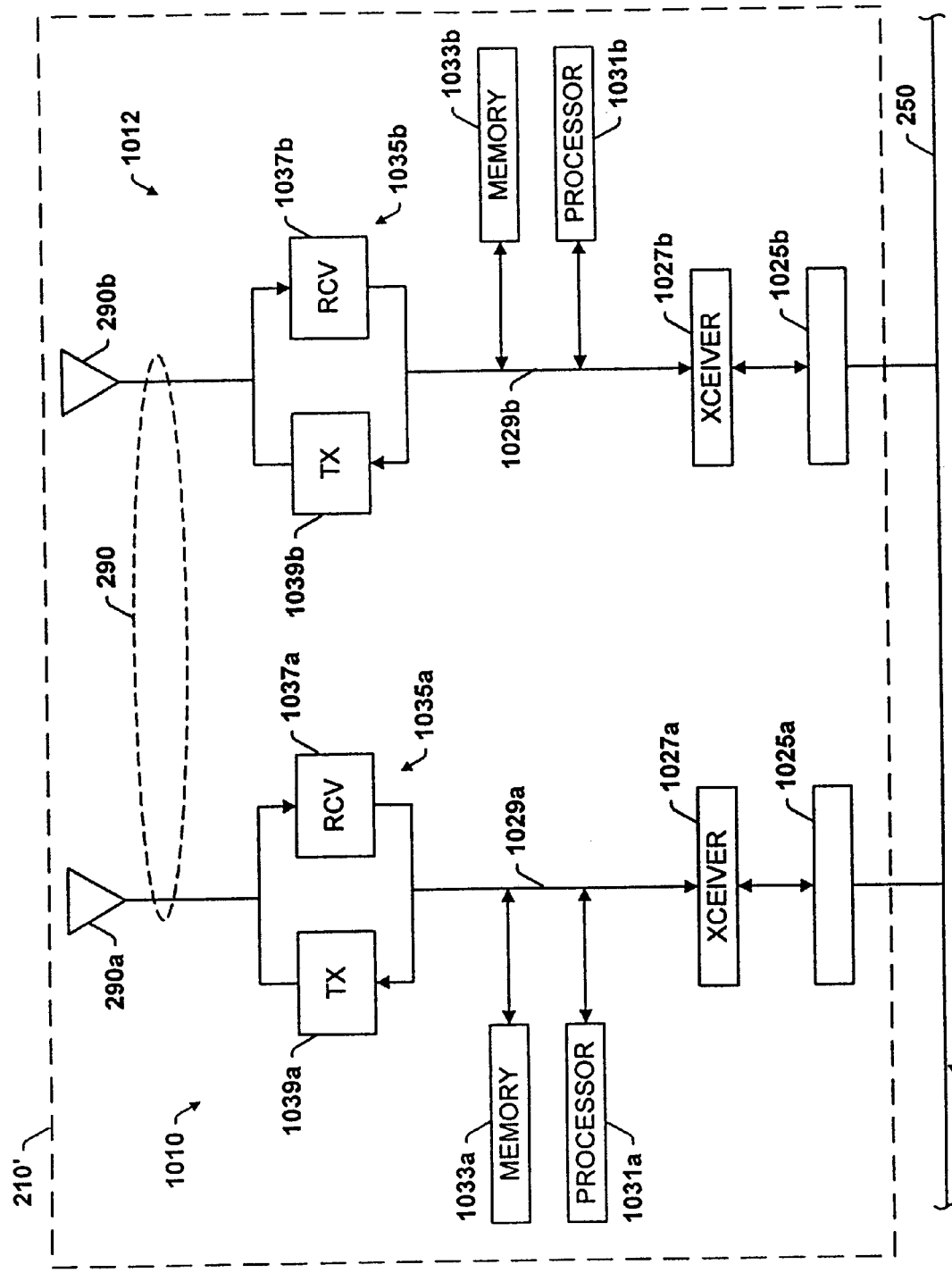
FIG. 10 is a block diagram of a base station suitable for use in the system shown in FIG. 9 in accordance with the present invention.

Referring to FIG. 10, a detailed block diagram of one embodiment of the base station 210' is shown. The base station 210' is made up of two separate and discrete transceivers, namely a base station transceiver 1010 and a repeater controller transceiver 1012. The base station transceiver 1010 is configured to communicate with mobile terminals registered to the base station 210' via a first channel. The repeater controller transceiver 1012 is configured to perform all other communications, i.e., communications with other base stations, via a second channel, wherein the first channel is different from the second channel. According to one particular embodiment, the first and second channels may be different in the particular RF carrier frequency utilized to communicate the information. However, the difference between channels is not limited in the present invention to differences in frequency. For example, the channels may differ by varying the particular hopping sequence used in frequency hopping, or by varying PN code parameters such as the PN code length and the PN code sequence in a manner which provides for low cross-correlation. Cross-correlation refers to situations where PN code parameters are selected such that a correlator configured to operate at one set of parameters can nevertheless reconstruct a signal sent using another set of PN parameters. For instance, if two PN code parameters are selected having the same PN code length and only differ with respect to one chip in the PN code sequence, it is likely that high cross-correlation will exist given the ability of more correlators to reconstruct signals sent having a few minor discrepancies from what is expected. Thus, in order to utilize PN code parameters to create individual channels for communication, it is necessary to ensure that the parameters are selected such that there is low cross-correlation. In all cases, the primary criteria is simply that the transmissions on the different channels be discernible by the particular transceivers involved and not by other transceivers not intended to receive the communication.

The base station transceiver 1010 is connected to the system backbone 260 via a connector 1025a such as a DB-9 or RJ-45 connector. The connector 1025a is connected specifically to the network 250 at one end and to a network adapter transceiver 1027a included in the base station 210' at the other end. The network adapter transceiver 1027a is configured according to conventional network adapter transceiver techniques to allow the base station transceiver 1010 to communicate over the system backbone 260. The network adapter transceiver 1027a is also connected to an internal bus 1029a included within the base station transceiver 1010. The base station transceiver 1010 further includes a central processor 1031a connected to the bus 1029a for controlling and carrying out the operations of the base station transceiver 1010. The central processor 1031a, together with the other processors referred to herein, may include any of a variety of different microprocessors, such as the Motorola 68360 (25 MHz) or Intel 80386 or Pentium microprocessors.

The base station transceiver 1010 also includes a memory 1033a connected to the bus 1029a. The memory 1033a stores program code executed by the central processor 1031a to control the other elements within the base station transceiver 1010 and to carry out the functions described herein. It will be readily apparent to a person having ordinary skill in the art of computer programming how to program the central processor 1031a and the other elements within the base station transceiver to carry out the operations described herein using conventional programming techniques based on the flowcharts and descriptions provided herein. As a result, additional detail as to the specific program code has been omitted. The memory 1033a also serves to buffer packets of information such as those received over the system backbone 260 or those transmitted to or received from the mobile terminals. Moreover, the memory 1033a functions to store information such as those mobile terminals registered to the base station 210'. The registration of mobile terminals may be carried out using conventional techniques, or using the registration procedures described, for example, in pending U.S. app. Ser. No. 08/539,130 filed on Oct. 4, 1995. However, such particular registration procedures are not considered essential to the present invention and further detail is omitted.

Also connected to the bus 1029a is an RF section 1035a included in the base station transceiver. The RF section 1035a includes an antenna 290a for receiving radio signals from and transmitting radio signals to mobile terminals within the cell area of the base station 210' on a given channel. Information transmitted from a mobile terminal is received via the antenna 290a and is processed by an RF receiver 1037a which demodulates the signal and converts the information to a digital signal. As is conventional, the information from the mobile terminal typically is in the form of a packet including data together with a source identifier (i.e., the particular mobile unit sending the information) and a destination address identifying the device to which the mobile unit wishes to transmit the data. The processor 1031a in the base station transceiver 1010 inserts source routing information into the source routing field of the packet received from the mobile terminal, if needed. Thereafter, the processor 1031a stores the packet in the memory 1033a until such time as the base station transceiver is able to transmit the information packet onto the system backbone 260 via the network adapter transceiver 1027a and connector 1025a.

Information packets which are transmitted to the base station transceiver 1010 for transmission to a mobile terminal are received via the system backbone 260 by the network transceiver 1027a. The processor 1031a controls an RF transmitter portion 1039a included in the RF section 1035a, the RF transmitter portion 1039a also being connected to the bus 1029a. The processor 1031a causes the RF transmitter portion 1039a to modulate an RF signal using spread spectrum techniques, for example, which in turn carries the information to the desired mobile terminal on the given channel. Exemplary hardware and software for carrying out several of the above-described basic functions of transmitting and receiving data between the system backbone 260 and one or more mobile terminals is found in the ARLAN 631® Token Ring Access Point, which is commercially available from Aironet Wireless Communications, Inc., Akron, Ohio.

The repeater controller transceiver 1012 is substantially identical to the base station transceiver 1010, and hence the corresponding elements are denoted with a suffix "b" rather than "a". For example, the processor 1031a in the base station transceiver 1010 is equivalent to the processor 1031b in the repeater controller transceiver 1012. The relevant distinctions are as follows. As mentioned above, the repeater controller transceiver 1012 is responsible for communications between the base station 210' and the other base stations (e.g., wireless base stations 215a' and 215b') on a channel which is different from the channel on which the base station transceiver 1010 operates when communicating with the mobile terminals. Hence, the RF section 1035b is configured to operate on a different channel than the RF section 1035a in the base station transceiver. This can be by way of using a different RF carrier frequency in the RF transmitter and receiver portions, or by way of using different PN code parameters providing for low cross-correlation, for example.

The memory 1033b and processor 1031b are different in that they are used to process packets which are either to be transmitted to or received from another base station, although again conventional techniques are otherwise utilized. The memory 1033b in this instance would store the identities of those base stations which are associated with the base station 210' and the mobile terminals currently registered with those base stations.

Since the base station transceiver 1010 and the repeater controller transceiver 1012 are essentially isolated and each have their own separate processor, each can independently function to communicate with mobile terminals and base stations, respectively. This allows optimum processing times since neither transceiver processor is processing information for the other transceiver. The base station transceiver 1010 simply processes communications between the base station 210' and the mobile terminals while the repeater controller transceiver processes communications between the base station 210' and the other base stations. To the extent it may be desirable for the processors 1031a and 1031b to exchange information regarding changes in registration and the like, the processors may be programmed to communicate with each other via the system backbone 260 and the respective network transceivers 1027a and 1027b.

Figure 11:
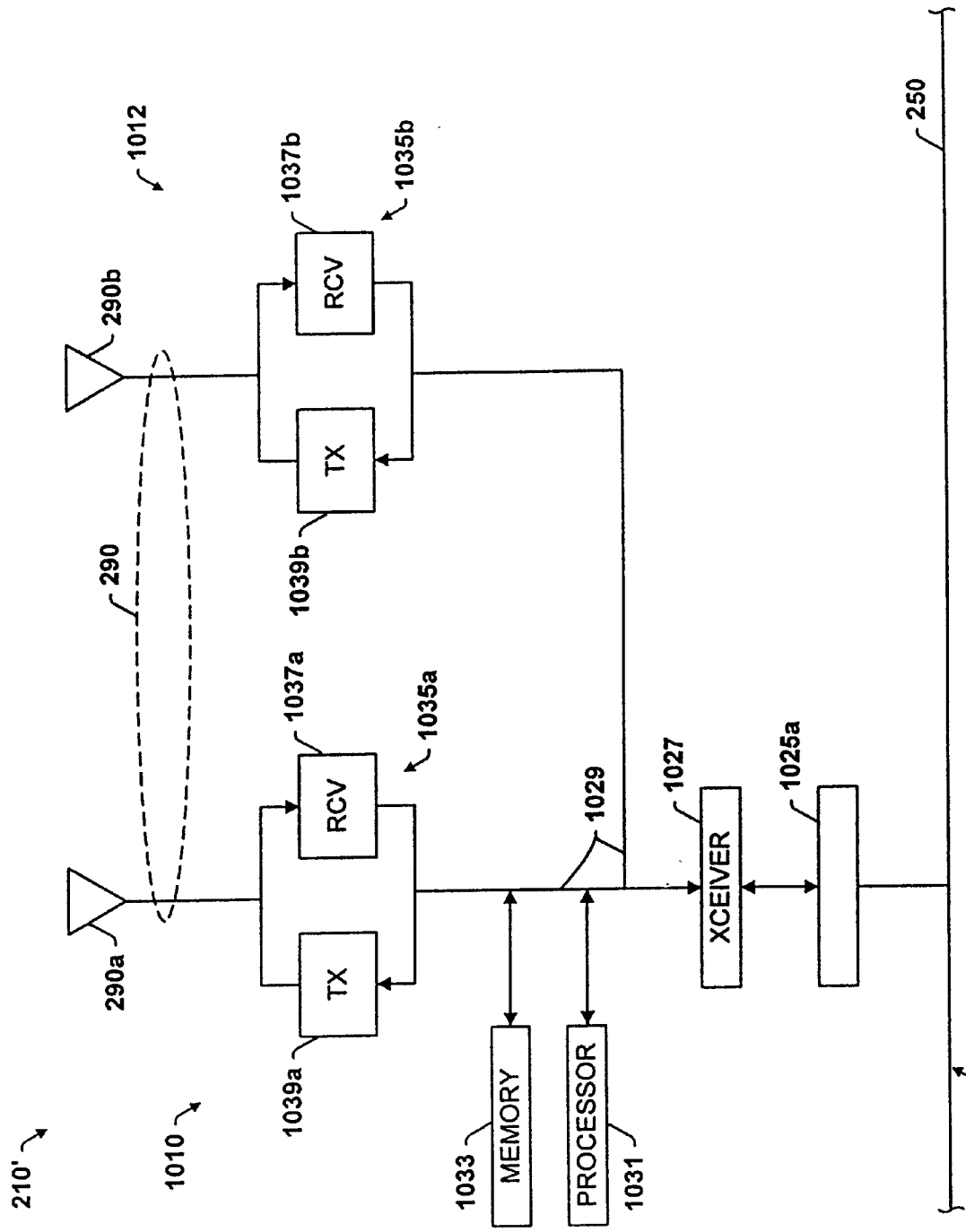
FIG. 11 is a block diagram of another base station suitable for use in the system shown in FIG. 9 in accordance with the present invention.

FIG. 11 shows another embodiment of the base station 210' in which the RF sections 1035a and 1035b of the base station transceiver 1010 and the repeater controller transceiver 1035b, respectively, share a common processor 1031 and memory 1033. The processing of the data received and transmitted by the respective RF sections is handled by the processor 1031, and all the appropriate information and operating code is stored in the memory 1033. Still, the RF sections 1035a and 1035b are configured such that communications with the mobile terminals via the RF section 1035a are carried out on a channel which is different from the channel on which communications with other base stations is carried out via the RF section 1035b. All of the devices are connected to a common bus 1029 which is connected to a network transceiver 1027 used to link the base station 210' to the system backbone 260. This particular embodiment of the base station 210' is particularly beneficial for those situations where the existing system backbone 260 does not have an extra location for the repeater controller transceiver 1012 to connect separately as in the embodiment of FIG. 10. However, since only a single memory 1033 and processor 1031 is available to control both transceivers, additional processing is necessary to handle packet receipt and transmission. Such processing is discussed below in relation to FIG. 13.

Figure 12:
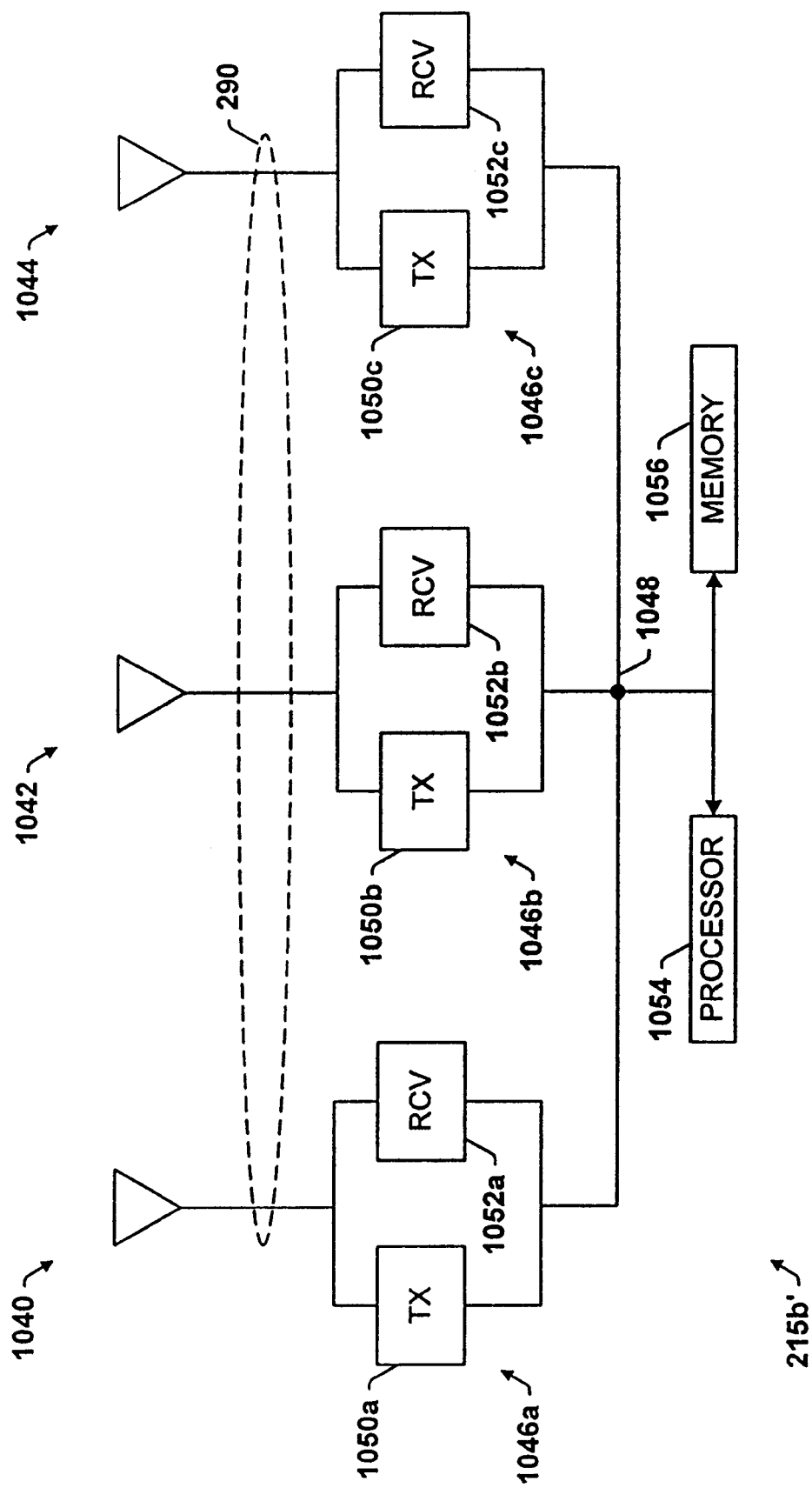
FIG. 12 is a block diagram of a wireless base station suitable or use in the system shown in FIG. 9 in accordance with the present invention.

FIG. 12 is a detailed block diagram of an exemplary embodiment of a wireless base station, and in particular wireless base station 215b' as shown in FIG. 9. The wireless base station 215b' includes a wireless base station transceiver 1040 together with repeater controller transceivers 1042 and 1044. The wireless base station transceiver 1040 and repeater controller transceivers 1042, 1044 each include an RF section 1046a, 1046b and 1046c, respectively, connected to a common bus 1048. Each RF section includes a corresponding transmitter 1050a–c for transmitting information and receiver 1052a–c for receiving information. A shared processor 1054 and memory 1056 are also connected to the bus 1048, the processor 1054 handling all of the system control and processing of data packets to be transmitted or received by any of the transceivers.

The actual transmission, reception and processing of the data packets via each of the transceivers may be carried out using conventional coding techniques, modulation techniques, etc., and may also utilize dynamically changing transmission parameters as discussed below. The difference is that the base station transceiver 1040 is dedicated to handling communications between the wireless base station 215b' and any mobile terminals which are registered therewith, such communications being carried out on a mobile terminal communication channel. The separate repeater controller transceivers 1042 and 1044, on the other hand, are dedicated to handling communications one or more other channels between the wireless base station 215b' and one or more other base stations (e.g., base station 210') or wireless base stations (e.g., wireless base station 215c') as represented in FIG. 9. In the particular embodiment of FIG. 12, the repeater controller transceiver 1042 is configured to transmit and receive information to/from the base station 210' on a channel different from that used by the wireless base station transceiver 1040. Similarly, the repeater controller transceiver 1044 is configured to transmit and receive information to/from the wireless base station 215c' on a channel different from those utilized by the transceivers 1040. Hence, there is even less contention for channel use due to the fact that the wireless base station 215b' communicates with base stations and mobile terminals using different channels. In a different embodiment, the repeater controller transceivers of wireless base station 215b' would each communicate on even separate channels from one another to further decrease any potential for contention areas where cells may overlap. In still another embodiment, the wireless base station 215*b*' may include only a single repeater controller transceiver which is configured to communicate with all base stations, whether wireless or not, using the same channel.

In operation, the use of repeater controller transceivers on a dedicated channel eliminates unnecessary delays which may otherwise occur due to overlapping cell areas. The processor of each base station 210', 215' is configured to differentiate and handle packets as is appropriate and as is discussed more fully below. Thus, for example, each processor maintains in its corresponding memory a list of each mobile terminal registered to the base station. Additionally, a list is maintained of each wireless base station which is associated with the base station in order to extend its range and each mobile terminal currently registered to the associated wireless base stations. Such information is used by the processor to determine how information should be handled in each case as exemplified in FIGS. 13 and 14 below. As mentioned above, the particular protocol for determining which base station/wireless base station a mobile terminal is registered with can be any conventional protocol. The processor(s) in each of the embodiments of the base stations and wireless base stations can be programmed to carry out the functions described herein by a person having ordinary skill in the art based on the present disclosure. As a result, additional detail is omitted.

Figure 13:
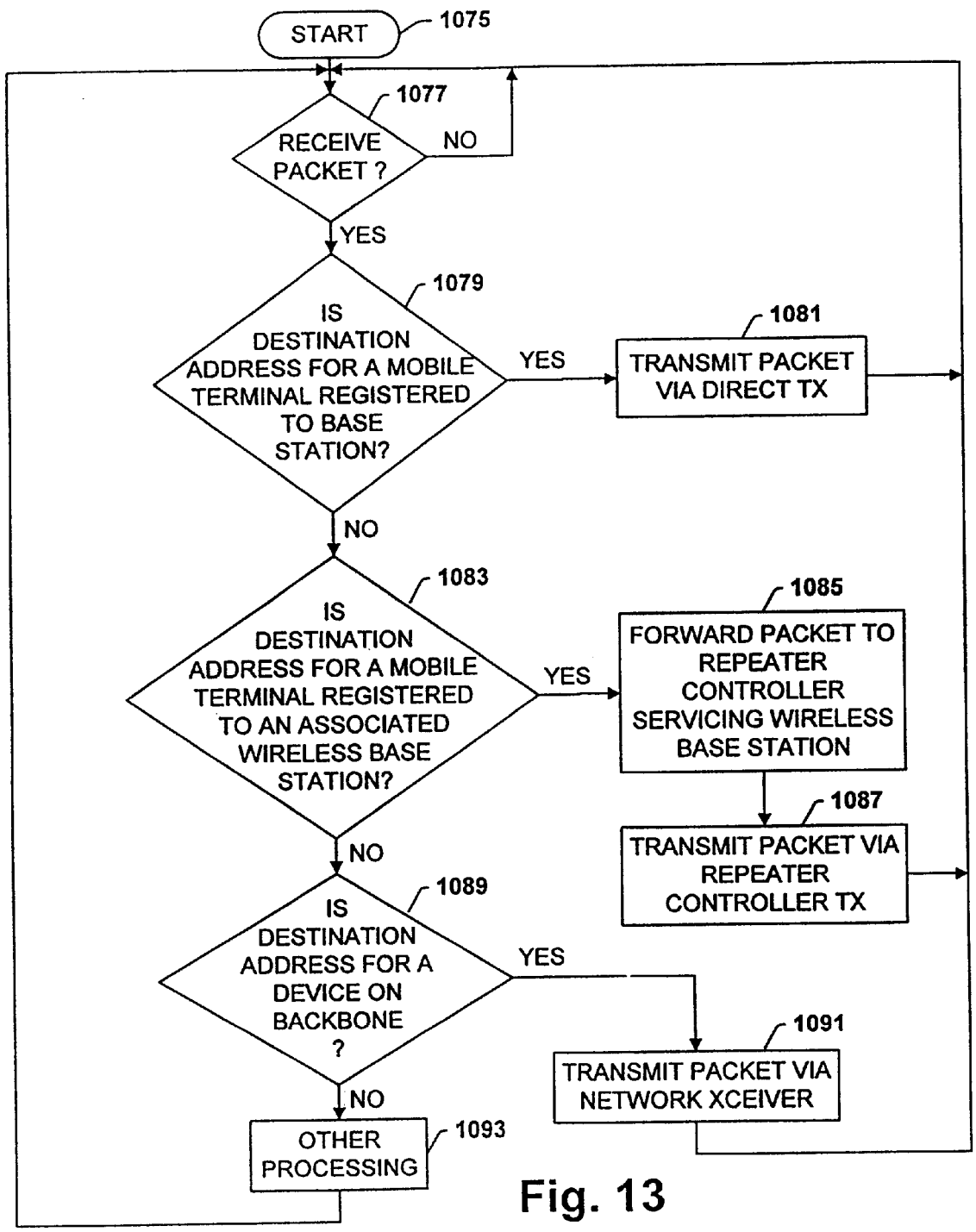
FIG. 13 is a flowchart representing the operation of the base station of FIG. 11 in accordance with the present invention.

FIG. 13 is a flowchart representing the operation of the base station 210' according to the exemplary embodiment shown in FIG. 11. In step 1075 the base station 210' goes through a self-initialization routine upon powering up. The self initialization routine may, for example, clear all temporary memory and allow time for all electronic circuitry to fully stabilize prior to commencing operation. In step 1077, the processor 1031 determines if a packet has been received by the base station 210'. Such packet may be received from a mobile terminal on one channel via the base station transceiver 1035*a*, or from a wireless base station on a different channel via the repeater controller transceiver 1035*b*. Alternatively, the packet may be received from the system backbone 260 via the network transceiver 1027. In any of these situations, the transceiver receiving the packet forwards the packet to the processor 1031 for processing. If a packet has not been received in step 1077, the base station 210' continues to loop through step 1077 as shown in FIG. 13. When a packet is received, on the other hand, the processor 1031 proceeds to step 1079 where the destination address in the header field of the packet is evaluated to determine the destination of the received packet. Specifically, in step 1079 the processor 1031 determines if the packet is addressed to a mobile terminal which is registered to the base station 210'. This can be done by accessing a look up table in the memory 1033 including a list of the mobile terminals registered to the base station 210'.

If in step 1079 the processor 1031 determines that the packet is destined for a mobile terminal registered to the base station 210', the base station 210' proceeds to step 1081. The processor 1031 in step 1081 forwards the packet to the base station transceiver 1035*a* via bus 1029 where the RF transmitter portion 1039*a* is utilized to transmit the packet via the given communication channel directly to the mobile terminal. Following step 1081, the base station 210' returns to step 1077 and awaits receipt of the next packet. If in step 1079 the processor 1031 determines that the received packet is not addressed to a mobile terminal registered to the base station 210', the base station 210' proceeds to step 1083. The processor 1031 in step 1083 determines if the packet is addressed to a mobile terminal which is registered to a wireless base station (e.g., 215*a*' or 215*b*') which is associated with the base station 210'. By associated it is meant that the wireless base station is responsible for extending the range of the base station and is within the same communication chain. Specifically, the processor 1031 accesses a look up table in the memory 1033 which includes a list of associated wireless base stations and the mobile terminals currently registered thereto.

If the received packet is addressed to a mobile terminal registered to an associated wireless base station, the processor 1031 proceeds to step 1085 in which it forwards the packet to the repeater controller transceiver 1035*b*, via bus 1029, which is responsible for communication with the associated wireless base stations. Next, in step 1087 the RF transmitter portion 1039*b* in the repeater controller transceiver 1035*b* transmits the packet in the direction of the associated wireless base station with which the mobile terminal is registered. Such transmission may be directly to the wireless base station with which the mobile terminal is registered, or to another wireless base station responsible for forwarding the packet to the wireless base station with which the mobile terminal is associated. Notably, the RF transmitter portion 1039*b* transmits the packet on a communication channel which is different from the channel utilized by the base station transceiver 1035*a*. Following step 1087, the base station 210' returns to step 1077 where the base station 210' waits to receive the next packet.

In the event the packet is found not to be registered to an associated wireless base station in step 1083, the base station 210' proceeds to step 1089. The processor 1031 in step 1089 determines if the destination address of the received packet is another device on the system backbone 260. If yes, the base station 210' proceeds to step 1091 in which the processor 1031 transmits the packet onto the system backbone 260 via the network transceiver 1027. Thereafter, the base station 210' returns to step 1077 to await receipt of the next packet. If the destination address in step 1089 is determined not to be for a device on the system backbone, the base station 210' proceeds to step 1093 where the processor 1031 performs any other processing on the received packet which may be appropriate, including, for example, disregarding the packet as not being relevant to the base station 210'. Such other processing may be conventional and is not germane to the invention. Hence further detail is omitted. Thereafter, the base station 210' returns to step 1077.

It is noted that the processing speed of the processor 1031 is preferably sufficient to allow the processor 1031 to process packets associated with the base station transceiver 1035*a* and the repeater controller transceiver 1035*b* substantially simultaneously. Hence, even though the base station transceiver 1035*a* may be busy receiving a packet from a mobile terminal not registered to the base station due to overlapping cell areas, for example, the repeater controller transceiver 1035*b* can be utilized by the processor 1031 to communicate at the same time with other wireless base stations.

Figure 14:
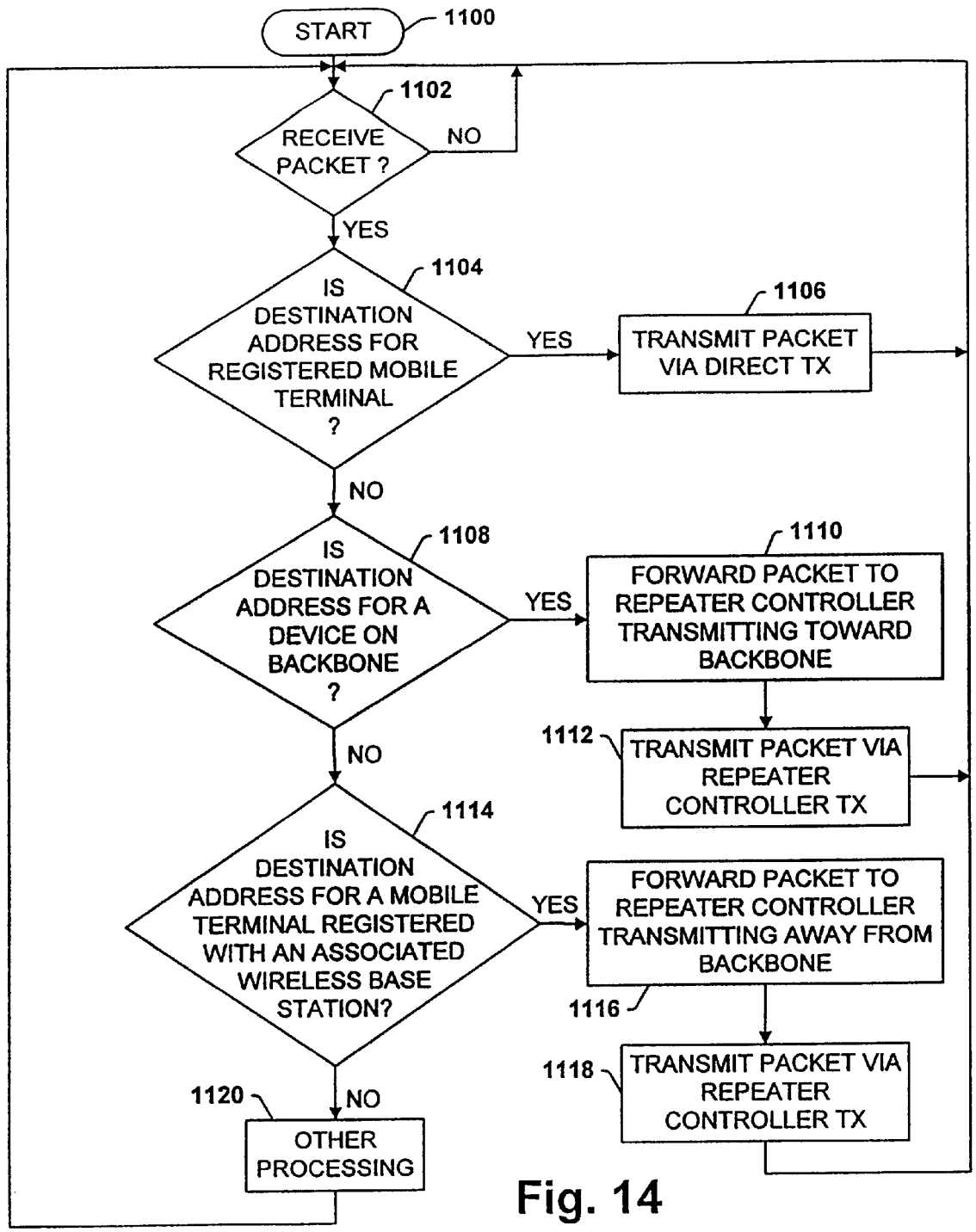
FIG. 14 is a flowchart representing the operation of the wireless base station of FIG. 12 in accordance with the present invention.

FIG. 14 is a flowchart representing the operation of the wireless base station 215*b*' according to the exemplary embodiment shown in FIG. 12. In step 1100 the wireless base station 215*b*' goes through a self-initialization routine upon powering up, for example. Next, in step 1102 the processor 1054 determines if a packet has been received by the wireless base station 215*a*'. Such packet may be received in step 1102 by the wireless base station transceiver 1040 from a mobile terminal via a first channel, by the repeater controller transceiver 1042 from the base station 210' via a channel different from that used by the wireless base station transceiver 1040, or by the repeater controller transceiver 1044 via the wireless base station 215c' via the channel in which repeater controller 1042 is operating, for example. Should any of the transceivers receive a packet, such packet is then provided to the processor 1054 by way of bus 1048.

If in step 1102 it is determined by the processor 1054 that a packet has not been received, the wireless base station 215b' continues to loop around step 1102 as shown in FIG. 14. If a packet is received as determined in step 1102, the wireless base station 215b' proceeds to step 1104 in which the processor 1054 evaluates the destination address in the header field of the packet to determine if the packet is destined for a mobile terminal registered to the wireless base station 215a'. Again this can be done by the processor 1054 accessing a look up table in the memory 1056 including a list of the mobile terminals registered to the wireless base station 215b'.

If in step 1104 the processor 1054 determines that the packet is destined for a mobile terminal registered to the wireless base station 215b', the wireless base station 215c' proceeds to step 1106. The processor 1054 in step 1106 forwards the packet to the wireless base station transceiver 1040 via bus 1048 where the RF transmitter portion 1050a is utilized to transmit the packet via the given mobile terminal communication channel directly to the mobile terminal. Following step 1106, the wireless base station 215b' returns to step 1102 and awaits receipt of the next packet. If in step 1104 the processor 1054 determines that the received packet is not addressed to a mobile terminal registered to the wireless base station 215b', the wireless base station 215b' proceeds to step 1108. The processor 1054 in step 1108 determines if the packet is addressed to a device on the system backbone 260. Specifically, the processor 1054 accesses a look up table in the memory 1056 which includes a list of all known devices on the system backbone 260. If a match is found, the processor 1054 proceeds to step 1110 in which it forwards the packet to the repeater controller transceiver 1042, via bus 1048, which is responsible for communication back towards the system backbone 260 via the base station 210'. Next, in step 1112 the RF transmitter portion 1050b in the repeater controller transceiver 1042 transmits the packet to the base station 210' which then forwards the packet onto the system backbone 260. Following step 1112, the wireless base station 215b' returns to step 1102 where the wireless base station 215b' waits to receive the next packet.

In the event the packet is found not to be destined for a device on the system backbone 260 in step 1108, the wireless base station 215b' proceeds to step 1114. The processor 1054 in step 1114 determines if the destination address of the received packet is a mobile terminal which is registered to another wireless base station which is associated with the wireless base station 215a'. For example, the packet may be destined for a mobile terminal registered to the wireless base station 215c'. Again, the processor 1054 determines if this is the case by referring to a look up table in memory 1056 which includes a list of those wireless base stations associated with the wireless base station 215c' and the mobile terminals currently registered thereto. If the processor 1054 determines in step 1114 that the packet is destined to a mobile terminal registered to an associated wireless base station, the wireless base station 210' proceeds to step 1116. In step 1116 the processor 1054 forwards the packet to the repeater controller transceiver 1044, via bus 1048, which is responsible for base station communications away from the system backbone 260. Next, in step 1118 the RF transmitter portion 1050c in the repeater controller transceiver 1044 transmits the packet to the base station 215c' which then forwards the packet to the mobile terminal registered thereto, for example. Following step 1118, the wireless base station 215b' returns to step 1102 where the wireless base station 215b' waits to receive the next packet.

If the destination address in step 1114 is determined not to be for a mobile terminal registered to an associated wireless base station, the wireless base station 215b' proceeds to step 1120 where the processor 1054 performs any other processing on the received packet that may be appropriate, including, for example, disregarding the packet as not being relevant to the wireless base station 215b'.

It is noted that the processing speed of the processor 1054 is preferably sufficient to allow the processor 1054 to process packets associated with the wireless base station transceiver 1040 and the repeater controller transceivers 1042 and 1044 substantially simultaneously. Hence, even though the wireless base station transceiver 1040 may be busy receiving a packet from a mobile terminal not registered to the wireless base station due to overlapping cell areas, for example, the repeater controller transceivers 1042 and 1044 can be utilized by the processor 1054 to communicate at the same time with other wireless base stations.

Figure 1:
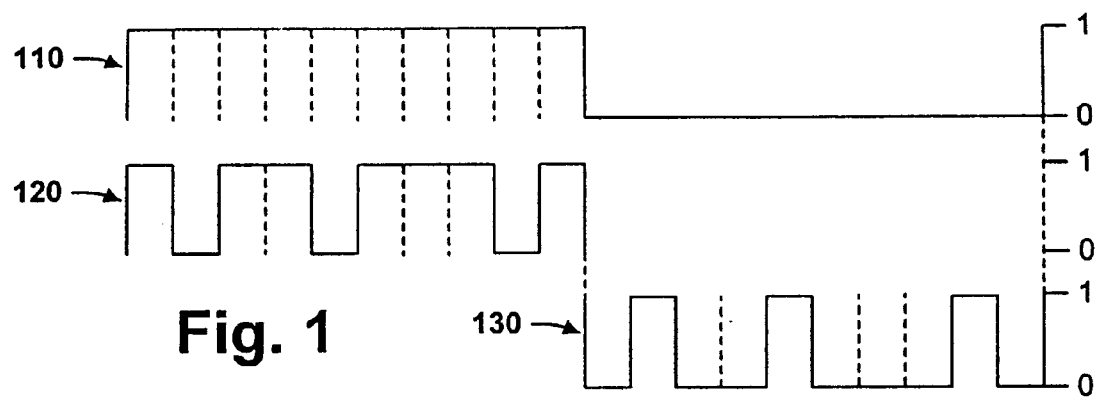
FIG. 1 is a schematic representation of a PN coded signal for data bits "0" and "1"
Figure 1A:
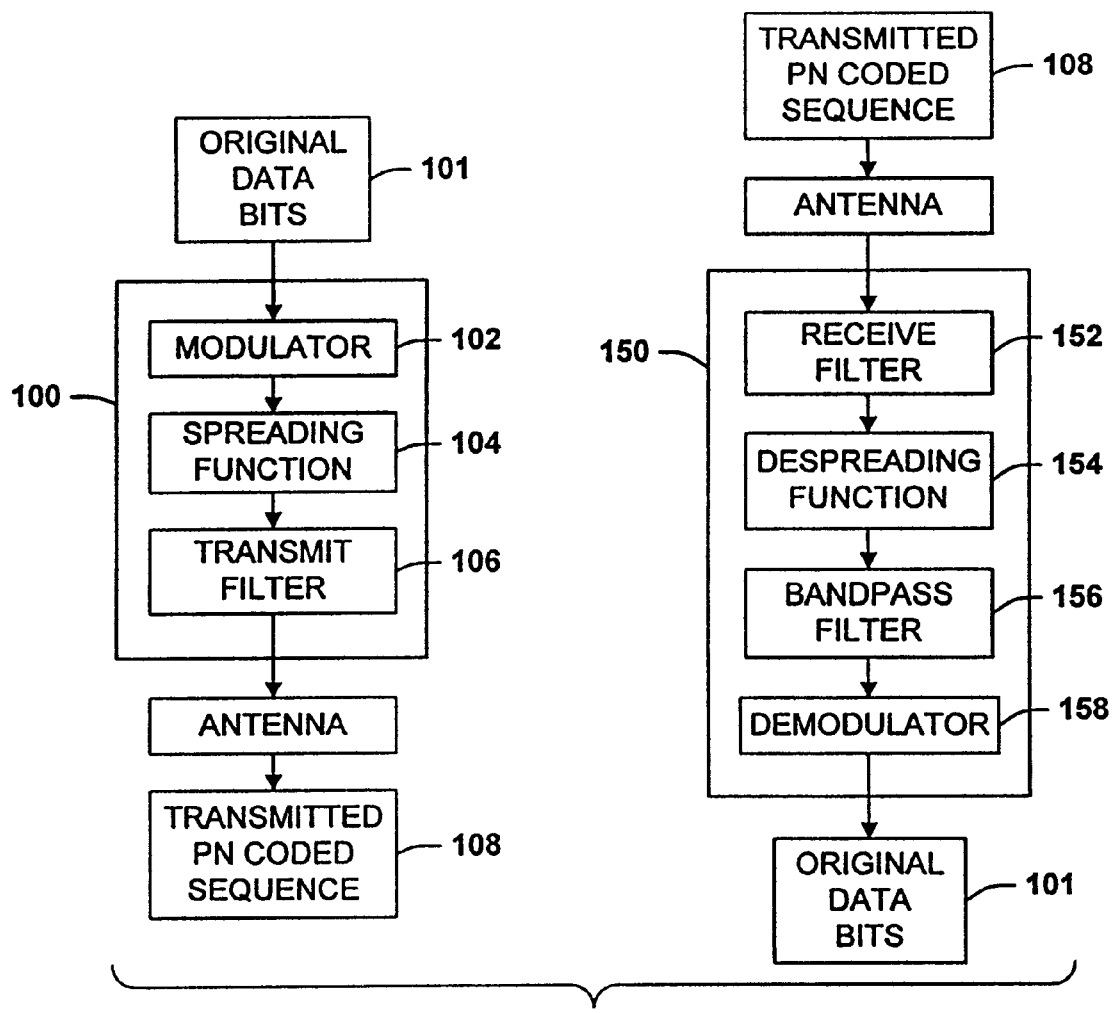
FIG. 1A is a schematic representation of a transmitter system and a receiver system of a DSSS communication system.

The various RF transmitter and RF receiver portions discussed above (e.g., 1039a–b, 1037a–b, 1050a–c and 1052a–c) can be of any conventional design such as those shown in FIG. 1A and discussed above. In the preferred embodiment, all RF transmitter and RF receiver portions utilized in the base station transceivers and wireless base station transceivers within the cellular communication system 200' communicate on the same channel, such channel corresponding to the same channel utilized by all of the mobile terminals 230' in the system 200'. All RF transmitter and RF receiver portions utilized in the repeater controller transceivers within the system 200' also communicate on a same channel, but such channel is different from the channel utilized by the mobile terminals and base station transceivers. As mentioned above, the channels may be different with respect to frequency, PN code, chip length, frequency hop sequence, etc. Further, another embodiment may include having the base station transceivers communicate using a frequency hopping protocol while the repeater controller transceivers use a direct sequence protocol, for example. Since direct sequence typically allows for faster data rates, the repeater controller transceivers operating in this manner may add to overall system performance in communication systems otherwise configured to operate using frequency hopping. The present invention is not necessarily limited to one type of difference among channels. The primarily criteria is that each of the two channels do not conflict with the transceivers utilizing the other channel. Those having ordinary skill in the art will appreciate that there are several ways for establishing different channels in accordance with the invention based on the disclosure herein.

It is again noted that a difference among channels only in the PN code sequence or PN code length itself may not be sufficient to avoid interference in overlapping cell areas. What is needed is a combination of PN code parameters which provide low cross-correlation as discussed above. For example, one technique for producing a difference among channels, as an alternative to frequency, is using different PN code lengths. Ideally, the code lengths of the two channels will be substantially different (e.g., 10 bits vs. 15 bits) and the PN code sequence associated with each will be relatively random with respect to the other. Additional methods and techniques for minimizing the cross-correlation are well known throughout the art and could be used in conjunction with this invention.

The above discussion regarding FIGS. 9–14 is based primarily on the respective channels for the mobile terminal and base station communications being static or fixed. However, mobile terminals and base stations using the dynamic aspects of the invention discussed above in relation to FIGS. 3B and 3C could also be utilized. For example, the base station transceivers and mobile terminals may be capable of altering their transmission characteristics as discussed above in order to optimize system performance. At the same time, the repeater controller transceivers in the base stations and wireless base stations may be configured in a similar manner. In this sense, the base station transceivers and mobile terminals are again operating on the same channel but the channel is considered dynamic (as the parameters may change). Similarly, the repeater controller transceivers are also considered to be operating on a same channel, it is just that the channel is dynamic. Care should be taken, however, to ensure that dynamic parameters of the channel utilized by the mobile terminals and base station transceivers do not overlap with the dynamic parameters of the channel utilized by the repeater controller transceivers. This avoids the base station transceivers and repeater controller transceivers unexpectedly operating effectively on the same channel. Thus, under this embodiment, a processor would be programmed to continually compare the transmission parameters of all operating transceivers and not allow any attempt by a transceiver to switch to a set of parameters already in use by another transceiver.

In such a dynamic system, if noise conditions change the repeater controller transceivers in the base stations and wireless base stations may change their transmission parameters to optimize system performance using the same protocol described above in relation to FIGS. 3B and 3C. Similarly, the base station transceivers (both wireless and hardwired) and mobile terminals can also dynamically change parameters. There may, however, be trade offs. For example, if the optimum data rate otherwise achievable by the respective devices may cause a contention in overlapping cell areas, it may be desirable to endure any contentions that may arise as opposed to reducing possibly the optimum data rate of some of the devices by changing the communication parameters to avoid such contention.

Figure 15:
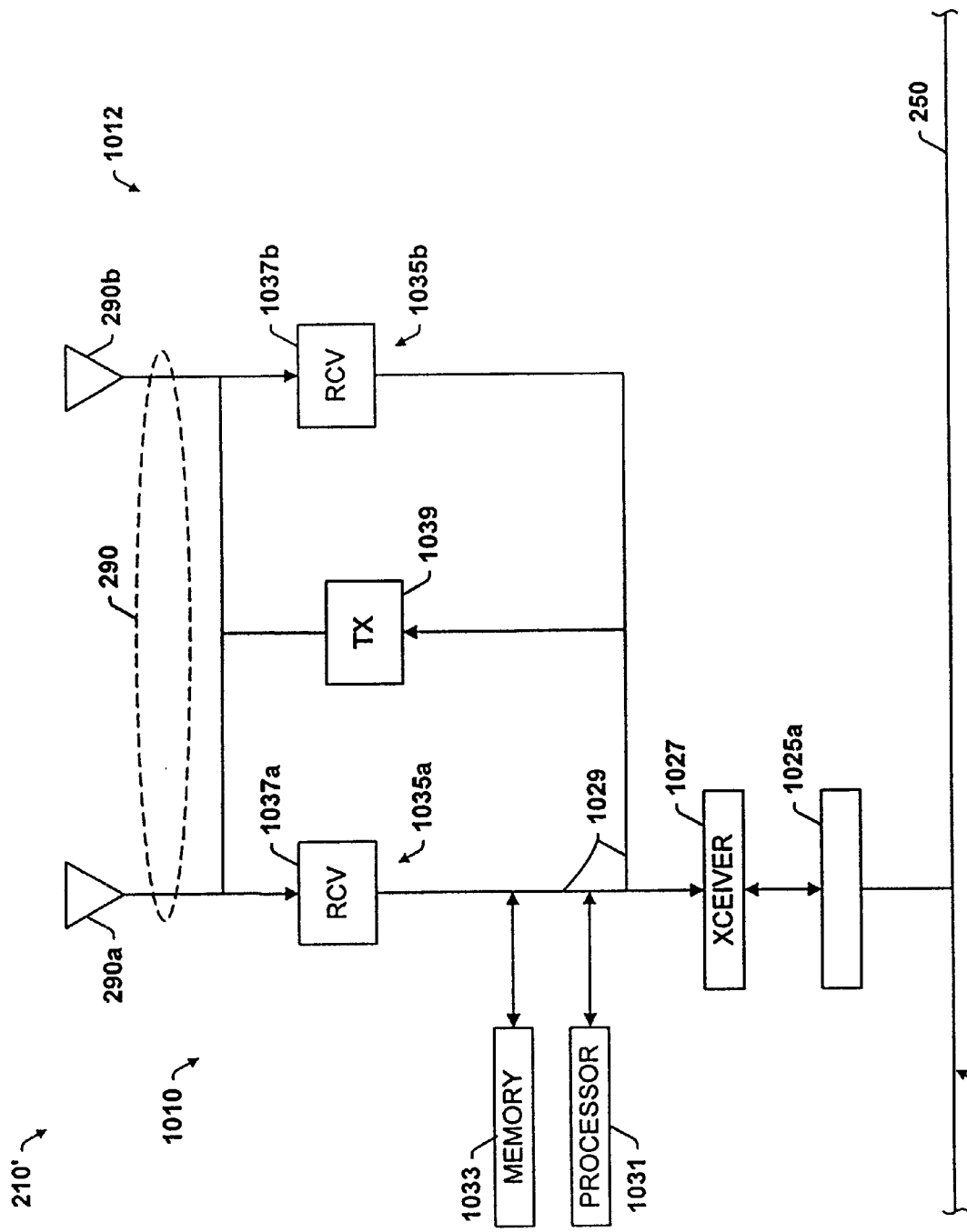
FIG. 15 is a detailed block diagram of a dynamically modifiable base station in accordance with the present invention.

In yet another embodiment of the present invention, the RF transmitter portion 1039 is switchable so as to be able to transmit information on the two different channels associated with the base station transceiver and repeater controller transceiver, respectively. FIG. 15 is a block diagram depicting this embodiment of the base station 210' in which a common RF transmitter portion 1039 is shared among the RF transmitter portions 1037a and 1037b, thus making the base station transceiver 1035a and repeater controller transceiver 1035b part of the same transceiver. For example, the RF transmitter portion 1039 can include the programmable transmitter portion of the base station 210 shown in FIG. 3C. The selectable modulation provided by switch 365 and BPSK and QPSK modulators 366a and 366b, together with the selectable PN code provided by the programmable PN encoder 320 can be controlled by the processor 1031 in FIG. 15 to determine what channel information is transmitted on. In the case of transmissions for the base station transceiver 1035a, as an example, BPSK modulation and a 10 chip PN sequence may be selected. For transmissions involving the repeater controller transceiver 1035b, QPSK modulation and a 15 chip PN sequence can be selected to represent a different channel by ensuring the PN sequences are selected in a manner which provides for low cross-correlation. In addition, or in the alternative, the processor 1031 may be connected to an RF oscillator (not shown) in the RF transmitter portion 1039 for altering the carrier frequency in order to provide different channels with respect to carrier frequency. Thus, by simply changing the transmission parameters of the RF transmitter portion 1039, it is possible for the base station transceiver 1037a and the repeater controller transceiver 1035b to operate on different channels even when using the same RF transmitter portion. This results in a reduction in cost and hardware as will be appreciated. It will also be appreciated that the wireless base station transceivers can similarly employ a common RF transmitter portion whose parameters are adjustable to determine the particular channel which is utilized.

As will be appreciated, the present invention avoids problems associated with channel contentions by having the base stations communicate amongst each other on a dedicated channel which is different from the channel used to communicate between mobile terminals and the base stations. Accordingly, overall system performance is improved.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible.

What is claimed is:

1. A cellular communication system, comprising:
   a base station coupled to a system backbone;
   a mobile terminal for communicating with the system backbone by way of the base station; and
   a wireless base station serving as an intermediary for communications between the mobile terminal and the base station;
   wherein the base station includes a base station transceiver for wirelessly communicating with the mobile terminal directly on a first communication channel, and a repeater controller transceiver for wirelessly communicating with the wireless base station on a second communication channel, the first communication channel being different from the second communication channel with respect to data coding technique.

2. The cellular communication system of claim 1, wherein the base station transceiver and the repeater controller transceiver are independently coupled to the system backbone.

3. The cellular communication system of claim 1, wherein the base station transceiver and the repeater controller transceiver share a common connection to the system backbone.

4. The cellular communication system of claim 1, wherein the difference with respect to data coding technique relates to at least one of PN code sequence and chip code length.

5. The cellular communication system of claim 1, wherein the wireless base station comprises a wireless base station transceiver for wirelessly communicating with the mobile terminal on the first communication channel, and a wireless base station repeater controller transceiver for wirelessly communicating with the base station on the second communication channel.

6. The cellular communication system of claim 5, wherein the wireless base station further comprises a power supply for providing power to operate the wireless base station, the power supply including a solar power device for deriving the power from solar energy.

7. The cellular communication system of claim 5, further comprising another wireless base station serving as another intermediary for communications between the mobile terminal and the base station, and wherein the wireless base station includes a second wireless base station repeater controller transceiver for wirelessly communicating with the another wireless base station on a third communication channel.

8. The cellular communication system of claim 7, wherein the second communication channel and the third communication channel are different.

9. The cellular communication system of claim 7, wherein the second communication channel and the third communication channel are the same.

10. In a cellular communication system comprising a base station coupled to a system backbone, a mobile terminal for communicating with the system backbone by way of the base station, and a wireless base station serving as a repeater for communications between the mobile terminal and the base station, a method of communication comprising the steps of:

the base station wirelessly communicating with the mobile terminal directly on a first communication channel, and wirelessly communicating with the wireless base station on a second communication channel, the first communication channel being different from the second communication channel; wherein the first communication channel and the second communication channel are different with respect to data coding technique.

11. The method of communication of claim 10, wherein the difference with respect to data coding technique relates to at least one of PN code sequence, and chip code length.

12. In a cellular communication system comprising a base station coupled to a system backbone, a mobile terminal for communicating with the system backbone by way of the base station, and a wireless base station serving as a repeater for communications between the mobile terminal and the base station, a method of communication comprising the steps of:

the base station wirelessly communicating with the mobile terminal directly on a first communication channel, and wirelessly communicating with the wireless base station on a second communication channel, the first communication channel being different from the second communication channel; wherein the base station includes a transceiver which dynamically modifies its transmission parameters to achieve the first communication channel and the second communication channel.

13. A base station for use in a cellular communication system having a system backbone, at least one mobile terminal and at least one wireless base station, comprising:

a communication circuit coupling the base station to the system backbone;

a base station transceiver for wirelessly communicating with the at least one mobile terminal directly on a first communication channel, and a repeater controller transceiver for wirelessly communicating with the at least one wireless base station on a second communication channel, the first communication channel being different from the second communication channel with respect to data coding technique.

14. The base station of claim 13, wherein the base station transceiver and the repeater controller transceiver are independently coupled to the system backbone.

15. The base station of claim 13, wherein the base station transceiver and the repeater controller transceiver share a common connection to the system backbone.

16. The base station of claim 13, wherein the difference with respect to data coding technique relates to at least one of PN code sequence and chip code length.

17. A wireless base station for use in a cellular communication system having a system backbone, at least one mobile terminal and at least one base station coupled to the backbone, comprising:

a wireless base station transceiver for wirelessly communicating with the mobile terminal on a first communication channel;

a wireless base station repeater controller transceiver for wirelessly communicating with the base station on a second communication channel, the first communication channel being different from the second communication channel with respect to a data coding technique; and another wireless base station repeater controller transceiver for wirelessly communicating with another wireless base station included in the cellular communication system on a third communication channel.

18. A cellular communication system, comprising:

a base station coupled to a system backbone;

a mobile terminal for communicating with the system backbone by way of the base station; and a wireless base station serving as an intermediary for communications between the mobile terminal and the base station;

wherein the base station includes a base station transceiver for wirelessly communicating with the mobile terminal directly on a first communication channel, and a repeater controller transceiver for wirelessly communicating with the wireless base station on a second communication channel, the first communication channel being different from the second communication channel, wherein the base station transceiver and the repeater controller transceiver are made up of a transceiver which dynamically modifies its transmission parameters to achieve the first communication channel and the second communication channel.

19. The cellular communication system of claim 18, wherein the wireless base station comprises a wireless base station transceiver for wirelessly communicating with the mobile terminal on the first communication channel, and a wireless base station repeater controller transceiver for wirelessly communicating with the base station on the second communication channel.

20. The cellular communication system of claim 19, wherein the wireless base station further comprises a power supply for providing power to operate the wireless base station, the power supply including a solar power device for deriving the power from solar energy.

21. The cellular communication system of claim 19, further comprising another wireless base station serving as another intermediary for communications between the mobile terminal and the base station, and wherein the wireless base station includes a second wireless base station repeater controller transceiver for wirelessly communicating with the another wireless base station on a third communication channel.

22. The cellular communication system of claim 21, wherein the second communication channel and the third communication channel are different.

23. The cellular communication system of claim 21, wherein the second communication channel and the third communication channel are the same.

24. In a cellular communication system comprising a base station coupled to a system backbone, a mobile terminal for communicating with the system backbone by way of the base station, and a wireless base station serving as a repeater for communications between the mobile terminal and the base station, a method of communication comprising the steps of:

the base station wirelessly communication with the mobile terminal directly on a first communication channel, and wirelessly communicating with the wireless base station on a second communication channel, the first communication channel being different from the second communication channel, wherein the base station includes a transceiver which dynamically modifies its transmission parameters to achieve the first communication channel and the second communication channel.

25. A base station for use in a cellular communication system having a system backbone, at least one mobile terminal and at least one wireless base station, comprising:

a communication circuit coupling the base station to the system backbone;

a base station transceiver for wirelessly communicating with the at least one mobile terminal directly on a first communication channel, and a repeater controller transceiver for wirelessly communicating with the at least one wireless base station on a second communication channel, the first communication channel being different from the second communication channel, wherein the base station transceiver and the repeater controller transceiver are made up of a transceiver which dynamically modifies its transmission parameters to achiever the first communication channel and the second communication channel.

26. A wireless base station for use in a cellular communication system having a system backbone, at least one mobile terminal and at least one base station coupled to the backbone, comprising:

a wireless base station transceiver for wirelessly communicating with the mobile terminal on a first communication channel; and a wireless base station repeater controller transceiver for wirelessly communicating with the base station on a second communication channel, the first communication channel being different from the second communication channel wherein the base station transceiver and the repeater controller transceiver are made up of a transceiver which dynamically modifies its transmission parameters to achieve the first communication channel and the second communication channel.

* * * * *